United States Patent
Ly et al.

(10) Patent No.: US 11,381,645 B2
(45) Date of Patent: Jul. 5, 2022

(54) INTERNET OF THINGS CONFIGURABLE EVENT AND ACTION SEQUENCING FRAMEWORK

(71) Applicant: CONVIDA WIRELESS, LLC, Wilmington, DE (US)

(72) Inventors: Quang Ly, North Wales, PA (US); Dale N. Seed, Allentown, PA (US); Zhuo Chen, Claymont, DE (US); William Robert Flynn, IV, Schwenksville, PA (US); Catalina Mihaela Mladin, Hatboro, PA (US); Rocco Di Girolamo, Laval (CA); Shoshana Loeb, Philadelphia, PA (US); Hongkun Li, Malvern, PA (US)

(73) Assignee: Convida Wireless, LLC, Wilmington, DE (US)

( * ) Notice: Subject to any disclaimer, the term of this patent is extended or adjusted under 35 U.S.C. 154(b) by 116 days.

(21) Appl. No.: 16/644,318

(22) PCT Filed: Sep. 6, 2018

(86) PCT No.: PCT/US2018/049669
§ 371 (c)(1),
(2) Date: Mar. 4, 2020

(87) PCT Pub. No.: WO2019/051028
PCT Pub. Date: Mar. 14, 2019

(65) Prior Publication Data
US 2021/0067591 A1 Mar. 4, 2021

Related U.S. Application Data

(60) Provisional application No. 62/554,753, filed on Sep. 6, 2017.

(51) Int. Cl.
*H04L 67/125* (2022.01)
*H04W 4/70* (2018.01)
*G16Y 40/35* (2020.01)

(52) U.S. Cl.
CPC ............ *H04L 67/125* (2013.01); *G16Y 40/35* (2020.01); *H04W 4/70* (2018.02)

(58) Field of Classification Search
CPC ........ H04L 67/125; H04L 67/16; H04W 4/70; H04W 4/38; G16Y 40/35; G16Y 20/30
See application file for complete search history.

(56) References Cited

U.S. PATENT DOCUMENTS

| 9,413,827 B2 | 8/2016 | Sharma et al. |
| 2015/0067154 A1 | 3/2015 | Ly et al. |
| 2016/0041534 A1 | 2/2016 | Gupta |

OTHER PUBLICATIONS

"By Mirosamek (talk)—1 (Mirosamek (talk)) created this work entirely by myself", (https://en.wikipedia.org/w/indexlohp2curid-23947431), last edited Feb. 16, 2012, 3 pages.

(Continued)

*Primary Examiner* — Walter J Divito
(74) *Attorney, Agent, or Firm* — BakerHostetler LLP

(57) ABSTRACT

Internet of Things (IoT) configurable event and action sequencing mechanisms for interconnecting various IoT events together to achieve an event and action sequencing process that may efficiently enable complex uses of the data available in IoT systems.

16 Claims, 21 Drawing Sheets

(56) References Cited

OTHER PUBLICATIONS

OIC Core Candidate Specification V1.1.0 Part 1, Open Connectivity Foundation (OCF), Copyright 2016, 183 pages.
OneM2M Technical Specification, TS-0001 V3.4.0, "Functional Architecture", Feb. 2017, 475 pages.
Wikipedia, "Software Framework", https://en.wikipedia.org/wiki/Software_framework, Last edited on Jan. 16, 2020, 5 pages.
Jiaxin Yin et al: "Study of service transactions and re-usable service layer context", TR-0020-Study_of_Service_Transactions_and_Reusable_Service_Layer_Context-Vo_8_O.zip, ONEM2M, vol. Work Programme, Work Progr, No. version=v0.8.0 Jun. 13, 2017 (Jun. 13, 2017), pp. 1-63.

| Attributes & Child Resource | <eventState> Resources | | | | | | | | |
|---|---|---|---|---|---|---|---|---|---|
| | 201 | 202 | 203 | 204 | 205 | 243 | 206 | 244 | 207 | 208 |
| eventStateID | eid1 | eid2 | eid3 | eid4 | eid5 | eid5b | eid6 | eid6b | eid7 | eid8 |
| description | Destem/Crush Grapes | Maceration | Fermentation | Punching the Cap | Pressing | 1st Racking Transfer | Malolactic Fermentation | 2nd Racking Transfer | Barrel Aging | Clarification & Bottling |
| currentStatus | Completed | Completed | Completed | Completed | In progress | Inactive | Inactive | Inactive | Inactive | Inactive |
| timeDuration | | 1 day | 2 weeks | 2 weeks | | | 6 weeks | | 1 year | |
| exitConditions | | | [timeDuration, transition3] | | | | [timeDuration, transition3] | | [control, transition2] | |
| <transition1> | | | | | | | | | | |
| transitionEvents | grapes = 0 | timer = 6hrs | timer = 4hrs | timer = 5mins | must = 0 | tank1 = 0 | timer = 6hrs | tank2 = 0 | timer = 4wks | timer = 0 |
| executeActions | add additives | check levels, add additives | check temp, adjust temp | punch = off | press = off, rack1 = on | rack1 = off | check temp, adjust temp | rack2 = off | check levels, adjust levels | filter = on |
| nextEventStateID | eid2 | eid2 | eid3 | eid3 | eid5b | eid5b | eid6 | eid6b | eid7 | eid8 |
| <transition2> | | | | | | | | | | |
| transitionEvents | | timer = 24hrs | timer = 6hrs | | tank = 0 | timer = 24hrs | timer = 3days | transition1 = done | timer = 1 yr | clarify = 0 |
| executeActions | | add yeast | punch = on | | rack = off | remove lees1, add bacteria | stir tank | check levels, adjust levels | check levels, adjust levels | filter = off, bottle = on |
| nextEventStateID | | eid3 | eid4 | | eid5 | eid6 | eid6 | eid6b | eid8 | eid8 |
| <transition3> | | | | | | | | | | |
| transitionEvents | | | sugar = 0 | | timer = 48hrs | | ferment = 0 | transition2 = done | | bottling = 0 |
| executeActions | | | press = on | | remove lees, add bacteria | | rack2 = on | remove lees 2 | | bottle = off |
| nextEventStateID | | | eid5 | | eid6 | | eid6b | eid7 | | END |

FIG. 15

INTERNET OF THINGS CONFIGURABLE EVENT AND ACTION SEQUENCING FRAMEWORK

CROSS-REFERENCE TO RELATED APPLICATIONS

This application is the National Stage Application of International Patent Application No. PCT/US2018/049669, filed Sep. 6, 2018, which claims the benefit of U.S. Provisional Patent Application No. 62/554,753, filed on Sep. 6, 2017, entitled "Internet of Things Configurable Event and Action Sequencing Framework," the contents of which are hereby incorporated by reference herein.

BACKGROUND

The Internet of Things (IoT) is an emerging technology where devices encompassing everyday objects can be interconnected via the Internet or some other network technology to send and receive data. The devices themselves can be large or small, provide sensor data or receive actuator commands to perform actions, and can have different functionalities and capabilities. Some examples of IoT devices in the home are: presence sensors, lights, coffee makers, ceiling fans, refrigerators, audio systems, and SMART TVs. Complex IoT devices can range from industrial robots and machineries, internet gateways, smartphones, to even self-driving cars (or components thereof).

IoT applications can be built to process the vast amount of information generated by IoT devices. Analytics and data mining can be performed to extract patterns or trends provided by the raw data. Traditional web applications have pre-dominantly been limited in scope to the type of analytics that can be performed due to the availability of a limited data set for a particular application. By limited, it is generally meant in variety and not necessarily in size. IoT technologies, on the other hand, provides the capabilities to perform data mining over a varied and vast data set of raw data provided by IoT devices.

There can be many applications that are enabled to connect the various, and sometimes disparate, "Things" in an IoT system. For example, a homeowner's calendar schedule can be used in an IoT home automation system to interact and control the various IoT devices that are unrelated to each other: coffee maker, speakers, lights, HVAC system, garage door openers, cars, etc. Upon waking up in the morning, the day's news can be streamed to speakers in the bathroom while the user is taking a shower. A presence sensor can detect when the user exits the bathroom and starts brewing a cup of coffee. Similarly, another presence sensor can remotely start the car in the garage and open the garage door once the user is ready to leave for work. The HVAC system can then be adjusted to save energy usage after the garage door closes.

As can be seen, each of the aforementioned operations depend on operations that occurred previously. An IoT event is defined as the detection of a certain occurrence, e.g. the presence sensor detecting the user exiting a room or the closing of the garage door. An IoT action, on the other hand, is the resulting operation performed in response to the occurrence of that event—examples include the streaming of news to the speakers, the automatic remote start of the car, and the opening of the garage door. As a result, IoT events and actions are interrelated to each other and allows for the realization of real life conveniences afforded to by IoT systems. In the home automation use case, the user's schedule dictates the sequences of actions based on different occurrences. One set of actions may be triggered based on the user's normal commute, while another set of actions may occur when the user works from home or are on vacation. The sequence of actions may even be delayed if the user wakes up late. These actions, therefore, are triggered by the detection of events that occur in real time as opposed to a preprogramed schedule.

One of the main enablers of IoT technologies is the specification of service layer (SL) architectures. Standards Developing Organizations (SDOs) such as oneM2M and OCF are defining the architectural components with which IoT can be realized. These components consist of physical and virtual entities, resource models and representations, services and capabilities, protocol messaging, etc. IoT devices implementing these standards are then able to communicate with each other and provide the large data sets in both variety and size that IoT technologies promise.

Within SL architectures, various functionalities are provided with which the gathered data can be used and processed. One such functionality is event management: in oneM2M, the functionality is referred to as action triggering. The Open Connectivity Foundation has limited event management like functionality using scenes, rules, and scripts, but the functionality focuses mostly on automating operations and not processing events with multiple actions. Event Management is the process of detecting events in a system and performing some resulting actions in response to the occurrence of those events. In IoT systems, this is a powerful capability since data from many sources and types can be combined together to enable smarter applications as shown in the home automation use case described above.

SUMMARY

IoT architectures are still evolving and there is an attempt to determine how best to use the vast amount of data available to applications. Disclosed herein are IoT configurable event and action sequencing mechanisms for interconnecting various IoT events together to achieve an end process that may efficiently enable complex uses of the data available in IoT systems.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 15 illustrates an exemplary table that may be displayed on a graphical user interface that may be generated based on the methods and systems disclosed herein;

DETAILED DESCRIPTION OF ILLUSTRATIVE EXAMPLES

IoT systems offer many capabilities to use, mine, and analyze the large data sets that IoT devices may generate in both size and variety. The event management capability in IoT systems allows for relating various data sources together against some criteria and executing resulting action(s) to create smarter uses of the data available in the system. This capability, while powerful, offers a one-dimensional view of events and resulting actions—events are compared to user preferences and if there is a match, the system performs some desired actions. Some IoT use cases may require different actions to be performed based on the occurrence of certain events, which may occur dynamically. Conventional service layer (SL) event management capability may not support such functionality and if it does, it may be too complex and not user friendly enough to efficiently realize such functionality.

Conventional application programming may not scale well in an IoT system. Disclosed herein is a system (e.g., framework) in which implementation of these use cases are more efficient in view of the service layer. The service layer offers a RESTful process in which complex applications can be built using the services and resources available in the service layer. The disclosed EASP allows for the service layer to efficiently manage the operations and/or update of these complex applications. The resources as defined herein (e.g., EASP resource, EventState resource, or Transition resource) provides significant support to the EASP system.

Figure 1:
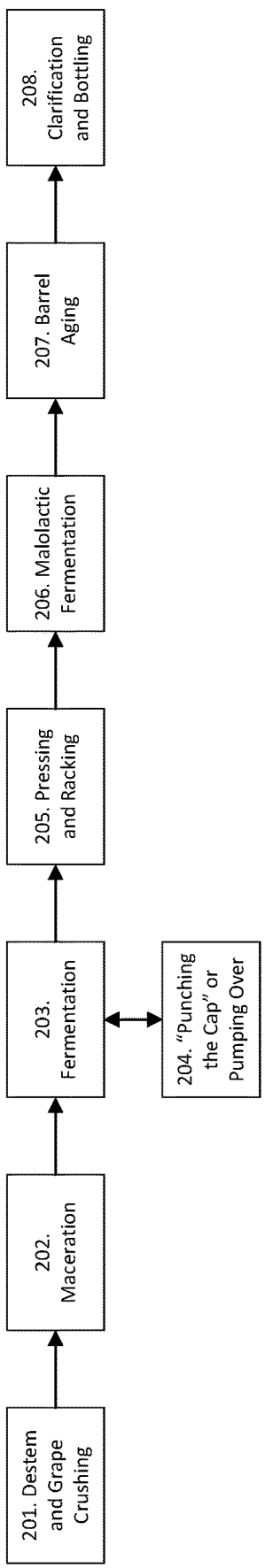
FIG. 1 illustrates an exemplary red wine making process.

A red wine making use case can illustrate the need for more advanced event management capabilities in IoT systems. FIG. 1 shows a high-level process of steps in making red wine after the grapes are harvested. The steps may be generally described as follows: Destem and Crush grapes (step 201), maceration (step 202), Fermentation (step 203), pumping over (step 204), pressing and racking (step 205), malolactic fermentation (step 206), barrel aging (step 207), and clarification and bottling (step 208).

At step 201, the harvested grapes are put into a destemming machine or conveyor belt to extract the grapes from the stems. In addition, the grapes are crushed to allow for the juices to mix with the skins and also for fermentation. The juice and grape solids are referred to as "must". At step 202, the must is transferred to fermentation tanks and allowed to sit in order to pick up flavor, color, and tannin. The must is tested for total acidity, sugar content, and pH levels and corrections are made if any of the levels are off to ensure a better wine. At step 203, yeasts are added to the tanks to start the fermentation process. The yeast converts the sugar in the must into carbon dioxide and alcohol to produce wine. Heat is produced when the must ferments and hence temperature must be controlled at a certain range to ensure a good, quality wine. The fermentation temperature will operate on a schedule from 60 degrees F. to anywhere from 70 to 85 degrees F. or 80 to 90 degrees F. over the fermentation period, which may be up to two weeks. In addition, the sugar level is monitored regularly to determine when the fermentation is complete. During fermentation, the grape solids (skins and seeds) float to the top and is referred to as the "cap". At step 204, a process of "pumping over" is undertaken several times a day to pump the must at the bottom of the tank on top of the cap to ensure a homogenous mixture. This process is also referred to as "punching the cap" if a tool is used to push the cap back down the must. The temperature is adjusted during this process to the desired range.

With continued reference to FIG. 1, once fermentation is complete, at step 205, the juice (now wine) is drained into a holding tank and the remaining must, which is called the "pomace", is transferred to a press. The press squeezes the pomace to get the remaining wine, which are combined with the wine in the holding tank. For higher quality wine, only the drained wine is used. After pressing, the wine in the holding tank is left to settle and a layer of sediment called the "lees" forms at the bottom. The wine is then "racked", which involves moving the wine into another tank to leave behind the "lees" and anything else that might cloud the wine. At step 206, the wine may then undergo an optional second fermentation step in which the malic acid is converted into lactic acid. A malolactic (ML) bacteria is added that produces compounds to give the wine more body. The wine is stirred twice a week and the temperature is kept between 70 to 75 degrees F. This process may last from 2 to 6 weeks. Once ML fermentation is completed, at step 207, the wine is racked again and it is transferred to a storage vessel such as a barrel. During this transfer, the total acidity and pH may be adjusted to improve the wine. The aging process requires a constant temperature range of between 55 to 60 degrees F. and the wine is tasted every 4 to 6 weeks and adjusted if necessary to ensure the wine is developing well. In addition, if the wine were stored in barrels, the humidity level is maintained between 65 to 75%. This step may take months to over a year before the wine is ready for the next step. At step 208, the wine may go through the step of clarification. This step involves adding a fining agent to the wine to remove any unwanted elements in the wine and then filtering that agent from the wine. In addition, any final adjustments (total acidity, pH, residual sugar, etc.) may be made before the wine is bottled. Once bottled, the wine may be aged further from anywhere between two months to a few years as the wine gets better with age.

As may be seen from the wine making process, there are multiple steps involved and numerous variables that go into making wine. An IoT system may be used to monitor and control the various "things" in the system of such a complex process. Sensors may be utilized to measure temperature, pH, sugar, and total acidity levels, while commands may be sent to control pumps used for "pumping over" and for both the pressing and racking steps. Since the transition from one step to the next may depend on the results of sensor measurements and on prior steps of the process, an IoT system may readily be designed to automate much of the wine making process.

From observing the wine making use case, there are various requirements placed on IoT systems that may require advanced realization of event management capabilities. One requirement may be the use of multiple actions in response to different triggering conditions of a particular event, such as making a determination to progress to the next step based on sugar levels or other measurements in the wine making use case. Another requirement may involve adjustments made that are based on the results of sensor measurements. A third requirement may be the ability to update the operation of an application due to changing inputs and integrate the update into normal operational behavior as shown by the ability to adjust the total acidity, pH, and sugar levels during the wine making process.

Conventional IoT event management capability focuses primarily on the occurrence of a single event. It focuses on the successful detection of the event and does not support actions for unsuccessful or alternative occurrences of events. Due to the focus on a single event, the interactions among various events requires defining multiple, separate events and configuring their interactions, which may be complex or cumbersome. The addition or update of events may cause rippling effects to existing events and may require temporary suspension of operations. In real time IoT operations, these limitations reduce the usefulness and benefits of existing event management capabilities.

The promise of IoT systems are vast and varied. Billions and billions of IoT devices are expected to provide data of many types and for many uses. The future of IoT will result in a vast set of data with which to create new, smarter applications using a variety of data from many different sources. As a result, IoT applications are getting more complex and require more capabilities to enable these smarter uses.

IoT architectures are still evolving and there is an attempt to determine how best to use the vast amount of data available to applications. Disclosed herein are IoT configurable event and action sequencing mechanisms for interconnecting various IoT events together to achieve an end process that may enable complex uses of the data available in IoT systems. IoT configurable event and action sequencing may include the following:

Defining an architecture in which events of complex/distributed IoT systems are interconnected together to take advantage of both the large, varied data sets and of evolving system conditions Defining a RESTful interface in which resources and attributes are used to dynamically define and expose the interconnection of events to users for monitoring and management purposes. These resources are combined together into a well-structured IoT process for linking the events with the resulting actions.

Defining a procedure for dynamically updating the IoT process while it is actively running to account for evolving conditions in the system.

Providing the ability for specifying the interactions of different IoT processes with each other to enable even more complex operations. These interactions may involve one IoT process triggering the start, stop, suspend, restart, and reset of another IoT process and the IoT processes may run in parallel with each other.

Defining a procedure for executing the IoT process through interactions with IoT devices in the system.

Providing examples of how the disclosed configurable event and action sequencing system may be applied to existing IoT architectures.

Figure 2:
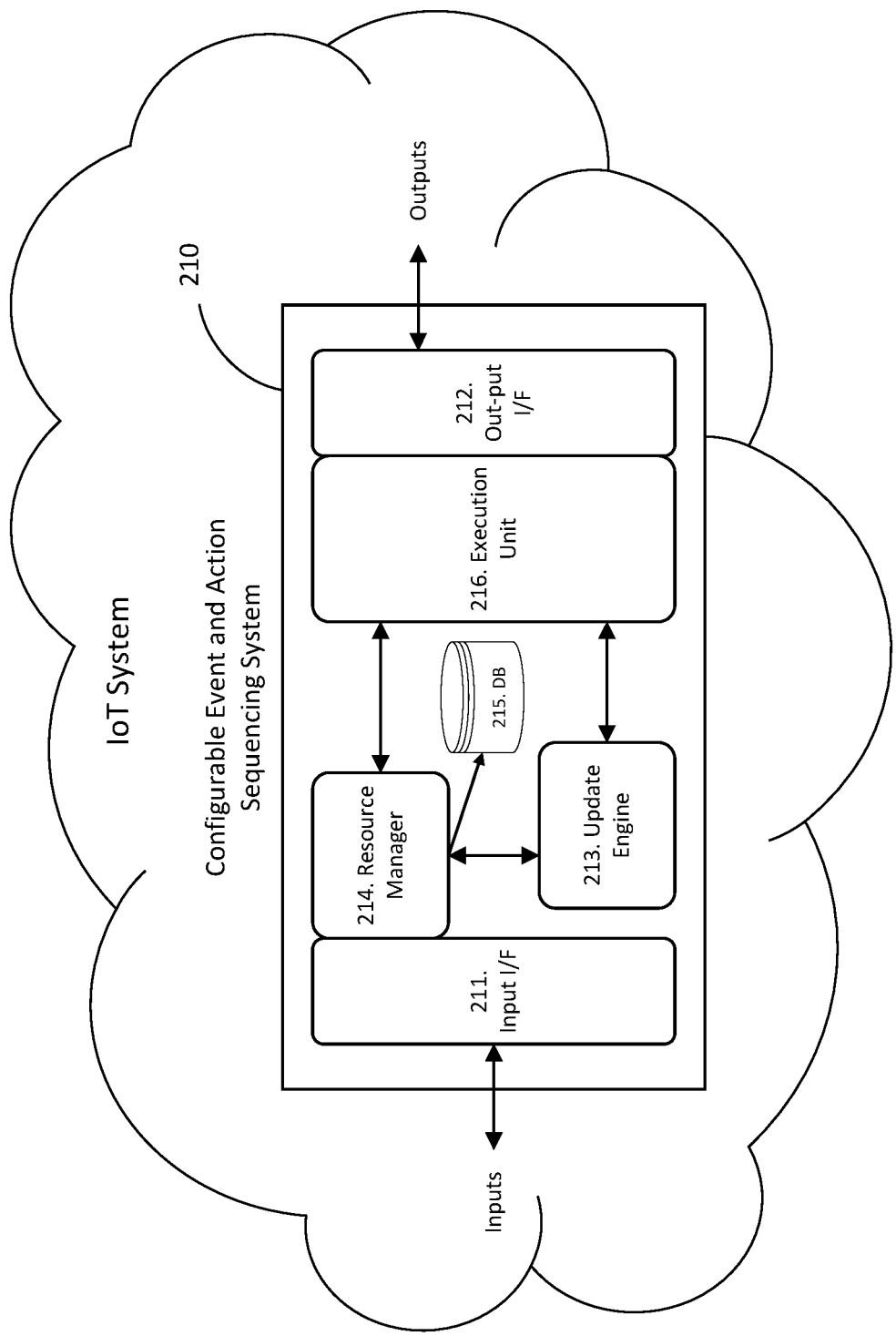
FIG. 2 illustrates an exemplary IoT Configurable Event and Action Sequencing Architectural Framework.

FIG. 2 illustrates an exemplary system 210 for the IoT configurable event and action sequencing as disclosed herein. The components of the system may include resource manager 214, update engine 213, and execution unit 216. There are interface components, input interface 211 and output interface 212, that allows for interactions between the IoT system and the event and action sequencing system 210. Input interface 211 may provide a RESTful interface for IoT entities to specify, configure, update, and access information about the events and actions of an IoT process. Output interface 212 component provides mechanisms to monitor and control IoT devices in the system in response to the actions performed during the IoT process. These interface components may serve as the glue between the IoT configurable event and action sequencing system and the IoT system and are included for completeness. The input interface and output interface components are usually platform and protocol centric and are auxiliary functions needed for the event and action sequencing system 210 to operate.

Within system 210, resource manager 214 takes inputs from external IoT entities through the Input Interface component. Resource manager 214 manages the creation, storage, and maintenance of the resources associated with the IoT process. In addition, resource manager 214 interfaces with execution unit 216 to provide status information once the IoT process is activated and in operation. Execution unit 216 is in charge of carrying out the actions of the IoT process, sending commands to IoT devices, monitoring the status of the trigger conditions, and managing the event transitions. It interfaces to both resource manager 214 and update engine 213 to obtain the details of the operations of the IoT process. Finally, update engine 213 is responsible for handling dynamic requests to update the event conditions and actions of an IoT process while it is still in operation and ensure the updates do not interfere with current operations. As a result, it gets inputs from resource manager 214 and interfaces with execution unit 216.

Within system 210, an event and action sequencing process (EASP) is defined to capture the events and actions that are interconnected together to achieve a desired operation. EASP may be configured with events that detect changing system conditions in which the EASP operates on. Different actions may be assigned to the events to enact some operations and mechanisms are provided to specify the sequence of the next event(s) in the EASP. Resources are disclosed for representing the EASP to enable users to dynamically control the operations of the EASP (e.g., the ability to control the EASP via a request without affecting operations and if it does, the EASP handles how to respond to the request). Note that an EASP is an IoT process that interconnects together IoT events and actions into a desired sequence for an intended application. An EASP may be considered a framework for how to link events and actions together to form a processing flow (e.g., "action sequencing"). The EASP resources themselves may be the "program" that an EASP CSF executes. When executed, the EASP CSF may transition from one EventState resource to another EventState resource.

Figure 3:
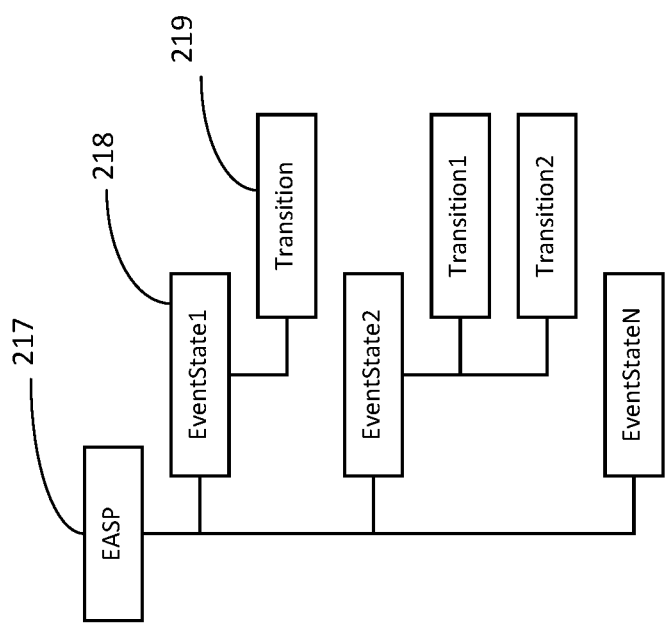
FIG. 3 illustrates an exemplary EASP Resource Hierarchy.

The events and actions of the EASP may be represented as resources in event and action sequencing system 210, in which the requestor creates and defines what the EASP is and what events trigger the operation of actions. As a result, an EASP resource may be disclosed with parameters used to describe the EASP. Within the EASP resource, an EventState resource may be used to describe each event in the EASP and further within the EventState resource, one or more Transition resources are provided to describe the actions that are executed and the next event in the EASP. FIG. 3 illustrates an example of the relationships of the disclosed resources in which the EASP resource (e.g., EASP resource 217) is the parent resource with multiple EventState resources (e.g., EventState resource 218) and their associated Transition resources (e.g., Transition resource 219). Within each resource, there may be parameters that provide pertinent information to capture information for that resource.

EASP resource 217 may include all the events and actions required by the EASP. Events are conditions in the IoT system that may trigger or cause some action(s) to be performed. Some examples of events are the threshold value or range of values of a particular sensor, the expiration of a timer, a RESTful operation (Create, Retrieve, Update, Delete) on a resource, the operation of turning on or off a device or entity, an action executed by another EASP, etc. Actions, on the other hand, are what is performed upon the detection of an event. They may involve a RESTful operation on a resource, the starting of a timer, a device management operation, a store and forward operation, the enabling of another EASP, the control of an actuator, an execution of a command, etc.

Another important feature provided by event and action sequencing system 210 is the ability to specify the interactions of EASPs with each other. The operation of an EASP may depend on the execution of some actions from another EASP. In addition, the events of two EASPs may intertwine with each other and may be used to control different aspects of the IoT system. These are powerful features provided by the disclosed event and action sequencing system 210 to allow for building complex EASPs through the interactions of simpler EASPs.

The EASP is a realization of an IoT process disclosed herein. In summary, event and action sequencing system 210 may be considered the overall functional system in which the EASP operates from. This is shown in FIG. 1. EASP is an instance of the interconnections of events and actions for a particular application—e.g. the wine making use case. EASP resource is the resource that represents an EASP. It may have child resource EventState, which may have child resource Transition, as shown in FIG. 3. EventState resources describe the states an EASP goes through to achieve the desired application (e.g., each step of the wine making use case). Disclosed herein, "EventState" is generally referred to as the resource and "event state" is the occurrence of the state associated with the "EventState" resource. Transition resources describe events that triggers transitions from one event state to another event state. In addition, actions may be executed during an event transition.

EASP Resource—EASP resource 217 may capture the details of an entire EASP. Table 1 shows some example parameters of the EASP resource. An EASP identifier may be used to associate EASP resource 217 with the details of the EASP and used by execution unit 216 to execute the operations of the EASP. The EASP identifier may be used by other EASP resources to trigger the operations of this EASP as a precondition or as an action due to some event. A description parameter allows for specifying the purpose of the EASP in a human readable form, while the current status parameter provides the running status of the overall EASP. The control parameter may be used to control the operations of the EASP from enabling it to pausing, resuming, exiting, and disabling the EASP. There may also be an automatic control where the EASP is run autonomously based on events within the IoT system. The preconditions parameter provides the prerequisite events that may occur before the EASP may begin and may be used in conjunction with the control parameter to run the EASP autonomously. The exit conditions parameter allows for the abrupt exit of the EASP in cases of emergencies where continuing the operation would be harmful or dangerous. This parameter provides for an asynchronous response from execution unit 216 to stop all actions related to the EASP and deactivates its operations. The "global" exit condition(s) may be continuously monitored and applied during the operation of the EASP regardless of the event state it is in.

There are many ways an EASP may be controlled as specified by the control parameter. This may depend on the implementation of event and action sequencing system 210 and below are some examples of how the control parameter may be specified. When an EASP is set to automatic control, the parameters associated with events and actions must be specified to provide guidance on how event and action sequencing system 210 should control the operations of the EASP. In this mode, the preconditions parameter may specify the events (e.g., conditions) or actions required for the EASP to start. Once started, the sequencing of the EASP will depend on the specified EventState resources 218 and Transition resources 219. The EASP may also be controlled using 'enable, on-demand', based on a timer with 'enable, time delayed', or 'disable'. Once the EASP is actively running, it may be interactively controlled by using: 'exit immediately', 'exit on percentage complete or exit event conditions', 'pause', 'resume', or 'reset'. The ability to pause, resume, or reset the EASP offers a very IoT centric interaction that may account for varying system conditions.

TABLE 1

EASP Resource Parameters

| EASP Parameter | Parameter Description |
|---|---|
| EASP ID | An identifier used for the current EASP definition that may be assigned by resource manager 214. The identifier should be unique within the domain of event and action sequencing system 210 or implementation. Once created, it may be immutable. The EASP ID may then be used by other EASPs to link their operations together, such as "preconditions" before the start of an EASP. |
| Description | A text description of the purpose for the EASP. |
| Current Status | The current status of the entire EASP. During operation, execution unit 216 provides the status to resource manager 214. The status may be in any format as determined by event and action sequencing system 210 (e.g., a percentage number, the name of the current active state, etc.). This status reflects the operation of the overall EASP. |

TABLE 1-continued

EASP Resource Parameters

| EASP Parameter | Parameter Description |
|---|---|
| Control | This parameter offers explicit control of the EASP. As a result, the requestor may interactively control the operations of the EASP. Some control operations may be the following: automatic, enable on-demand, enable time delayed, disable, exit immediately, exit on end of event state or percent complete, pause, resume, reset, etc. When in automatic mode, the preconditions parameter may be used to enable the EASP to begin. |
| Preconditions | This parameter specifies any preconditions that must be met in order for the EASP to begin. It may be used to trigger the start of the EASP when in automatic mode. This parameter may refer to other EASPs being enabled or being in a certain event state. Alternatively, the parameter may specify that certain external actions be performed prior to the beginning of the EASP such as executing a device management command or a sequence of commands using a script. The preconditions parameter specifies actions that need to be performed as a pre-requisite for the start of the EASP. |
| Exit Conditions | This parameter determines what events may end the EASP to allow for the premature, asynchronous exit of the EASP. It may be associated as a "stop immediate" command to disregard all other inputs and stop the operation of the EASP. This may be used as part of automatic mode to prevent undesirable events from occurring. Events may be a resource with a particular value or range of values, the detection of a change to a resource, the creation or deletion of a resource, a notification being processed, etc. One or more event expressions may be used to specify multiple exit conditions. Premature may be considered the stopping of the EASP before it is supposed to stop. For example, if an EASP is monitoring some machine in operation where if a certain temperature is reached (e.g. in a car's engine), the EASP may stop rather than continue and have the machine fail. Asynchronous may refer to events that do cause a transition from one EventState resource to another, e.g. not part of the sequence. |
| Number of EventStates | This captures the number of events in an EASP where N may be a numerical value with an upper limit that may be defined by event and action sequencing system 210 or implementation. Event and action sequencing system 210 typically maintains this information to represent the number of events in an EASP. |
| Initial EventState | This points to the initial event state when the EASP begins and is specified by using the EventState ID of the initial EventState resource. Event and action sequencing system 210 will transition operations of the EASP to this event state after it begins once all the precondition events (if any) have occurred. |
| Final EventState | This points to the final event of the EASP and may indicate the completion of the EASP. This is specified by using the EventState ID of the final EventState resource. The EASP completes after the completion of the final event. |

EventState resource—EventState resource 218 captures the details of an event and the state it maintains until transitioning to another event. When triggered, an event may perform an action and wait in a state to monitor for another event to occur before transitioning to another event state. An EventState Identifier is defined for execution unit 216 to process event state transitions and maintain status information. The event state may transition to another event state for a set time duration or due to the occurrence of certain event(s). If the event state is timed, the time duration parameter specifies how long the event operates for (e.g., an amount of time left) and when to transition to the next event state. If the event state transitions due to another event, then Transition resource 219 specifies the details of the event. An event exit conditions parameter is used to specify events that may exit the current event state similar to the exit conditions parameter of the EASP resource 217. Table 2 shows some example parameters for EventState resource 218.

TABLE 2

EventState Resource Parameters

| EventState Parameter | Parameter Description |
|---|---|
| EventState ID | An identifier used for the current event state that may be assigned by event and action sequencing system 210 or by the requestor. The identifier should be unique within the EASP definition. Once created, it may be immutable. The EventState ID may be used as an action that is performed from another EASP even if the current EASP is not enabled. In that case, only the actions are performed and no state transition occurs. |

TABLE 2-continued

EventState Resource Parameters

| EventState Parameter | Parameter Description |
| --- | --- |
| Description | A text description of the EventState. |
| Current Status | The current status of the event state. During operation, execution unit 216 provides the status to resource manager 214. The status may be in any format as determined by event and action sequencing system 210: a percentage number, the remaining time if the event state is time based, etc. |
| Time Duration | This parameter is the set time for the duration of the event state. When present, execution unit 216 starts a timer at the beginning of the event state and when the timer expires, the event state ends. |
| Event Exit Conditions | This parameter determines what events may end the current event state to allow for the premature, asynchronous exit of the event state. It may also give priority over other event state transition resources as a "stop immediately" command to disregard all other inputs and stop the operation of the EASP. Alternatively, the parameter may be used to ensure an event state is not stuck forever within a loop. This parameter may provide for granular control of states when in automatic mode. Events are defined as the same as those found in the EASP resource. |
| Transition Events | This parameter specifies the events that triggers an event state transition and the next EventState ID to transition to. As a result, the parameter may be of complex type. The presence of this and the Transition Actions parameters may remove the need for Transition resource 219. Alternatively, these parameters may be removed in lieu of Transition resource 219. |
| Transition Actions | This parameter may be a list of actions that are performed when the Transition Events parameter is triggered to transition to another event state. An action may be a command or a sequence of commands specified by a script to a device such as device management command(s). Another type of actions may be the execution of another EASP or an event within another EASP. A third type of action may be to create a resource in the IoT system or other mechanisms provided by the IoT system such as an API call. |
| Next EventState | The ID of the next EventState event and action sequencing system 210 should transition to if the Transition Event(s) occur. |

Transition resource—Transition resource 219 captures the condition(s) for triggering the transition to the next event state from the current event state. The Next EventState ID parameter specifies the EventState ID to transition to and if there are any actions that need to be executed, it is specified in the Execute Actions parameter. The Transition Events parameter specifies the event(s) that will trigger the event state transition to occur. The events may be specified as multiple expressions that combine individual events together through logical operators such as AND, OR, XOR, NOT, etc. Note that one Transition resource 219 may be created for each transition out of the current event state. As a result, there may be multiple Transition resources 219 for a particular EventState resource 217, each with different trigger events and potentially with their associate actions. Table 3 shows some example parameters for Transition resource 219.

TABLE 3

Transition Resource Parameters

| Transition Parameter | Parameter Description |
| --- | --- |
| Transition Events | The event(s) that causes an event state transition. The parameter may be complex to support multiple event triggers. The complex expression should be able to support logical operators such as AND, OR, XOR, NOT, etc. as well. |
| Execute Actions | If necessary, this parameter specifies the actions that are executed as a result of the detection of an event as specified by the Transition Events parameter. It may also be used to specify the end of the EASP. An event state transition may not need to execute any actions if it is not required. |

TABLE 3-continued

Transition Resource Parameters

| Transition Parameter | Parameter Description |
| --- | --- |
| | An action may be a command to a device such as a device management command. Alternatively, it may be to create a resource in the IoT system or other mechanisms provided by the IoT system. |
| Next EventState ID | The identifier of the next event state to transition to. |

Figure 4:
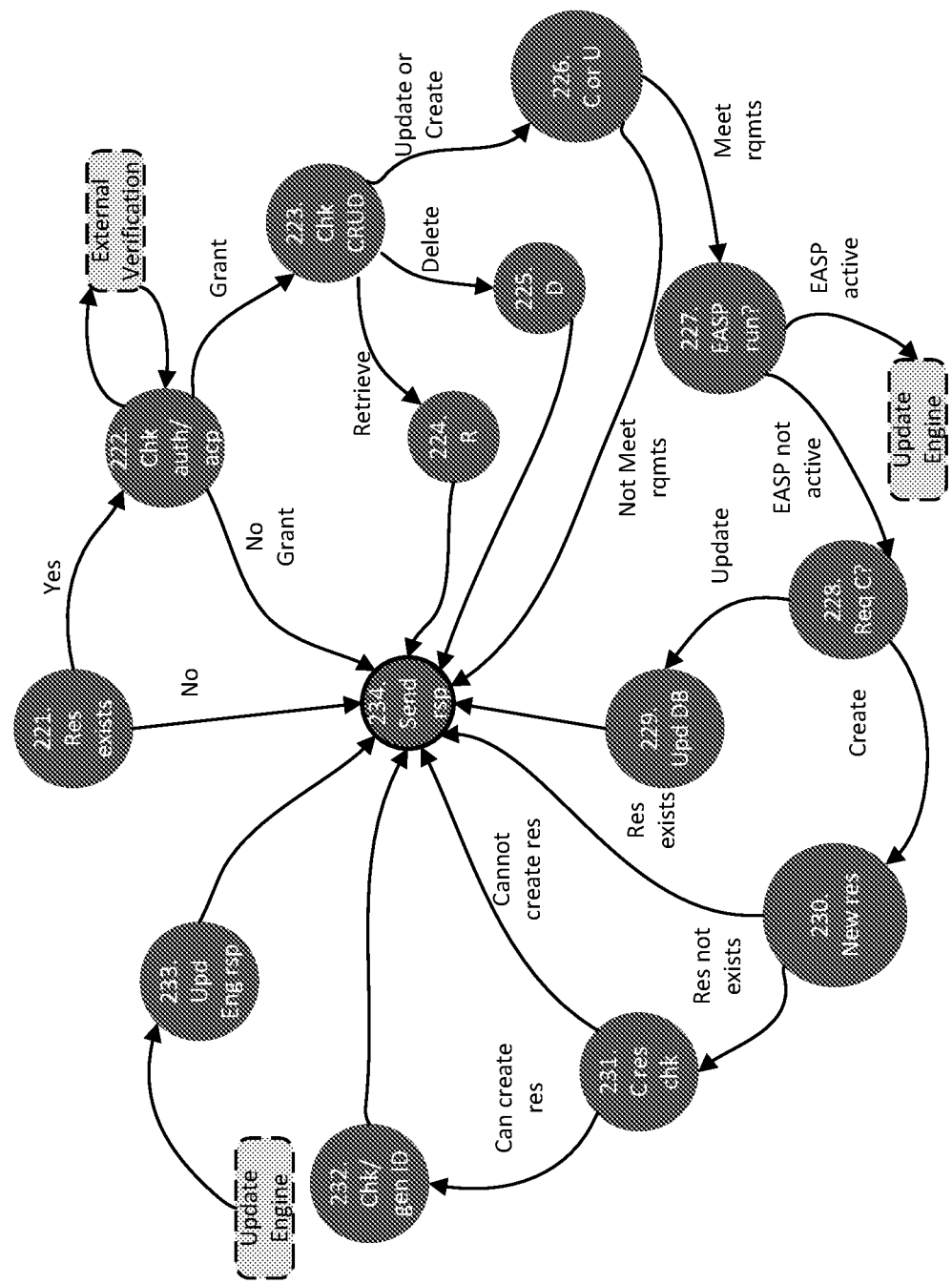
FIG. 4 illustrates an exemplary Resource Manager Procedure for Processing Requests.

Resource manager 214 receives requests from input interface 211 after a request has been parsed and validated. Resource manager 214 then proceeds to process the request based on the requested method. If the requested method is an update, resource manager 214 checks to see if the EASP process is actively running. If the EASP is still in operation, resource manager 214 forwards the request to update engine 213 with details of the update. FIG. 4 shows the procedure resource manager 214 executes in response to a request.

It is understood that the entities performing the steps illustrated herein, such as FIG. 4-FIG. 6, FIG. 8, FIG. 12, FIG. 14, etc., may be logical entities. The steps may be stored in a memory of, and executing on a processor of, a device, server, or computer system such as those illustrated in FIG. 17C or FIG. 17D. In an example, with further detail below with regard to the interaction of M2M devices, IoT device 242 of FIG. 5 may reside on M2M terminal device 18 of FIG. 17A, while system 210 of FIG. 2 may reside on M2M gateway device 14 of FIG. 17A. Skipping steps, combining steps, or adding steps between exemplary methods disclosed herein (e.g., FIG. 1, FIG. 4-FIG. 8, FIG. 12, FIG. 14, etc.) is contemplated.

The procedure of FIG. 4 describes the steps performed by resource manager 214 when evaluating a request from an IoT requestor. At step 221, check if the requested resource exists. If yes or if the request is to create one of the disclosed resources above (e.g., Transition resource 219, EventState resource 218, or EASP resource 217), go to step 222. If no, send error response, which may include step 234 (send response). At step 222, if necessary, check authorization or access control policies—there may be multiple steps involved here and may include interactions with external entities. If authorization or access control is granted, go to step 223. If not granted, generate an error response, which may include step 234 (send response). At step 223, check requested operation—CRUD (Create, Retrieve, Update, Delete). If requested operation is retrieve, go to step 224. If requested operation is delete, go to step 225. If requested operation is create or update, go to step 226. At step 224, access database and return one of the appropriate responses listed below. The response type may be specified as part of a request option, query string, etc. The appropriate response may include current resource representation, current status of the overall EASP as well as the status of the current event state, or the entire EASP resource structure. This information is returned at step 234 (send response). At step 225, check the current status of whether the EASP is operational and then go to step 234 to send the appropriate response. If the EASP is not running, delete appropriate resource identified in the delete request and the corresponding child resources. For the case EASP resource 217 is provided, the entire EASP structure is removed from database 215. If EASP is still running, return error response.

With continued reference to FIG. 4, at step 226, check provided information meets requirement for desired operation. For example, for create requests, does the provided information meet the requirements of the schema file for the associate resource type. If the information meets the schema requirements, go to step 227. If the information does not meet the schema requirements, send error response and go to step 234—send response. At step 227, check if the EASP is in operation. If EASP is in operation, forward request to update engine 213 and wait for a response in step 233. As part of the evaluation, resource manager 214 may need to interact with execution unit 216 to ensure the identified IoT devices (if any) may be available for access. This verification procedure may be delayed to a later time prior to activating the EASP and is system dependent. If the EASP is not in operation, go to step 228. At step 228, check requested method. If update, go to step 229. If create, go to step 230. At step 229, update information in database 215 with data provided in the request and go to step 234—send response. At step 230, if the requested resource exists and it is a create operation, send error response and go to step 234—send response. Otherwise, go to step 231. At step 231, evaluate if the requested resource may be created. If resource is able to be created, go to step 232; otherwise, send error response and go to step 234—send response. At step 232, if necessary, generate an identifier for the resource. Resource manager 214 may generate the identifier to ensure the uniqueness within the system. Alternatively, the identifier may be provided and resource manager 214 may check for uniqueness and then go to step 234—send response. At step 233, a response is received from update engine 213 and forward results to step 234—send response. If success response, update information in database 215. At step 234, Generate and send the response with appropriate code to the requestor.

As stated earlier, resource manager 214 may return different responses to retrieve requests based on the needs of the requestor. The default response may be the resource representation of the resource specified by the target identifier in the retrieve request. However, resource manager 214 may also format the response to include other pertinent information that are of interest to the requestor. One such response is the aggregation of the status of the operations of the EASP process: one for the entire EASP and the other for the current event state. Another type of response resource manager 214 may provide is the aggregation of the EASP resource structure within the response. This allows a requestor to retrieve all the events and actions of the EASP with one request. This information may help the requestor build or monitor the EASP and its events and actions. There may be other response types the event and action sequencing system 210 may return as well and will depend on the design of event and action sequencing system 210.

Execution Unit—Once the EASP process has been defined, its operations may be triggered by various events (e.g., based on the expiration of a timer, due to some preconditions, etc). Other triggers may also be defined and will depend on the event and action sequencing system 210. The execution of the EASP is then handled by execution unit 216, which interfaces to the IoT system through output interface 212 to ensure execution unit 216 has access to inputs to the EASP and also to actuator type devices for control if specified by an action.

Prior to the actual operation of the EASP, execution unit 216 may verify access to all inputs and outputs required for the EASP to run. This verification could be performed as the EASP resource definition and their event state resources are created. Alternatively, the verification could be performed after activation, but before the actual operation. In this case, the current status parameter of EASP resource 217 may be specified as "EASP verification" or some type of indicator to that effect.

Figure 5:
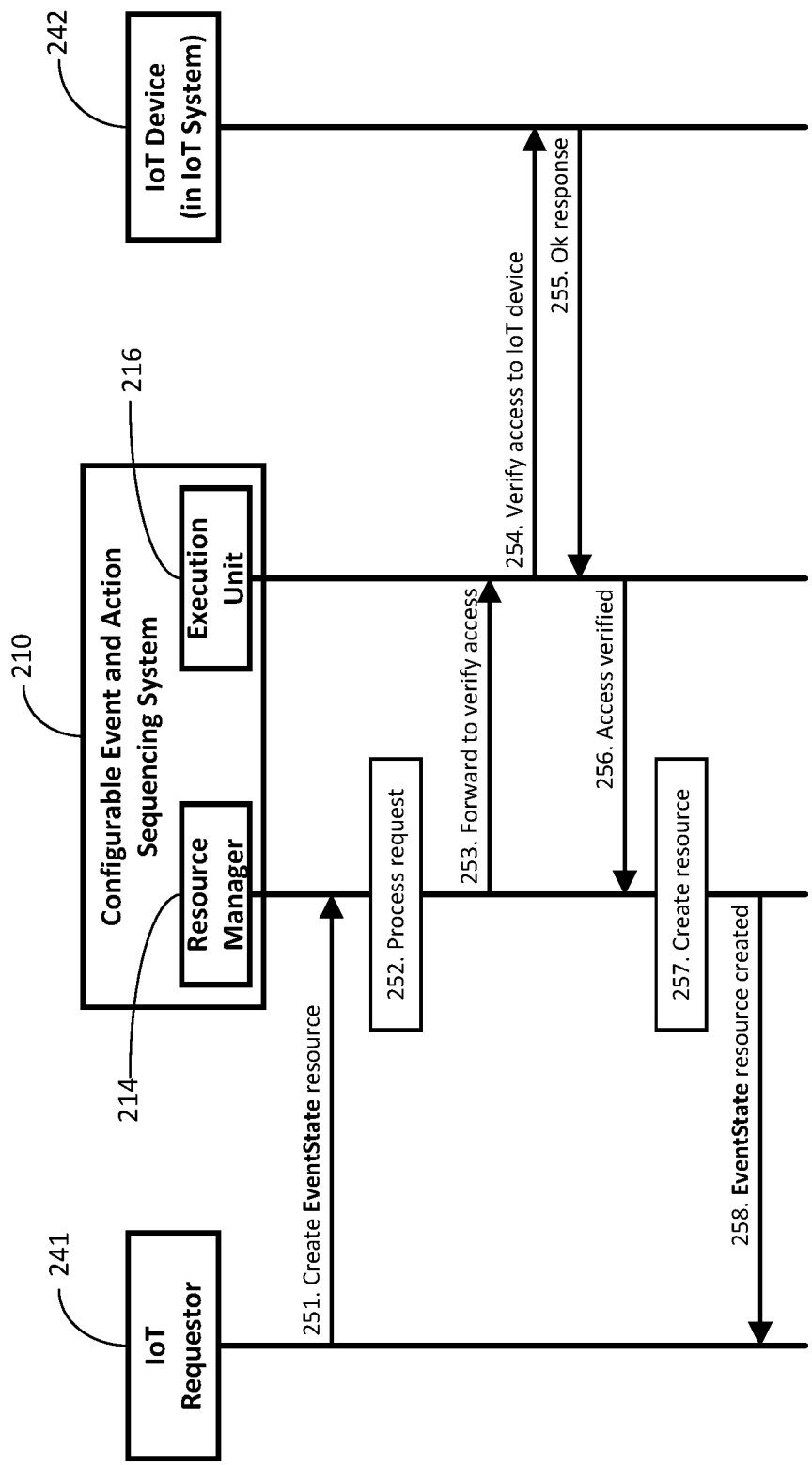
FIG. 5 illustrates an exemplary Execution Unit Access Verification to IoT System Procedure.

The actual verification may occur locally or remotely dependent on how event and action sequencing system 210 is integrated with the IoT system. If event and action sequencing system 210 is integrated as part of the IoT system, then accesses to sensor and actuator devices may already be established and execution unit 216 may need to reference an identifier or some URI to access that device. In remote cases, however, execution unit 216 may need the assistance of output interface 212 to set up messaging interactions with the devices. This may be in the form of subscription/notification mechanisms, use of protocol mechanisms (e.g. CoAP Observe), using polling methods, or some API calls that are exposed by the IoT system. In those cases, authorization or access control policies may also play a role in event and action sequencing system 210 getting access to the IoT devices. These issues are out of scope of the event and action sequencing system 210 and some mechanism should be provided by the IoT system for such accesses to enable the operation of event and action sequencing system 210. FIG. 5 shows an example procedure of the integration of resource manager 214 with execution unit 216 to process a create request of an EventState resource. Note that other components of event and action sequencing system 210 are not shown to minimize clutter in the diagram. It should also be noted that an application may create the resource and multiple resources may be created for one EASP. Resources may be created first in order to direct the EASP on how to operate. The resources disclosed herein are examples of how applications can program the EASP. Other examples may involve less resources, such as two resources.

FIG. 5 illustrates an exemplary Execution Unit Access Verification to IoT System Procedure. At step 251, IoT requestor 241 sends a request to create an EventState resource 218. This procedure may also apply to the creation of an EASP resource 217 or Transition resource 219. When creating EASP resource 217, the parameters specified may include the EASP ID, a description of the EASP, how the EASP is controlled, and any preconditions or exit conditions for the EASP. Table 1 lists other parameters that may be specified as well. When creating an EventState resource 218, parameters such as EventState ID, Time Duration, and Transition Events may be specified. Other EventState parameters are found in Table 2. With regards to Transition resource 219, it may include transition events, next EventState ID, and execute actions parameters, or the like, as described in Table 3. At step 252, resource manager 214 processes the requests and performs any necessary validations that are required by event and action sequencing system 210. At step 253, if validation is successful, resource manager 214 may forward the EventState information to execution unit 216 to verify access may be made to the IoT devices 242.

With continued reference to FIG. 5, at step 254 execution unit 216 (in conjunction with output interface 212) sends a request to IoT device 242. This request may be a simple retrieve to verify IoT device 242 is reachable or it may involve creating a subscription or CoAP observe. Another purpose of the request is to ensure that any authorization or access control is configured to allow event and action sequencing system 210 access to IoT device 242. If no access is granted, this information may be returned to IoT requestor 241. At step 255, if access is granted, IoT device 242 returns an Ok or an appropriate response. At step 256, execution unit 216 returns a response that access to IoT device 242 was verified. At step 257, resource manager 214 creates the EventState resource and saves the information to a database. At step 258, a created response is generated and sent to IoT requestor 241. If the procedure was unsuccessful, an appropriate error response is returned.

Once the verification is complete and event and action sequencing system 210 is able to execute all the actions required by the EASP, execution unit 216 will commence operation and track the EventState transitions. During the course of operations, execution unit 216 and resource manager 214 may maintain communications to enable the transfer of status information to the requestor as needed. Execution unit 216 also interfaces with update engine 213 to determine if new, dynamically added EventState resources 218 to the EASP or changes to existing EventState resources 218 may be integrated without affecting operations. Disclosed herein is a capability to update a process (e.g., an application) while it is actively running. Conventionally, this requires a stoppage of an application, but the EASP does not need to be stopped. Event and action sequencing system 210 allows the change to occur and it does this without affecting existing operations other than what is changed. In other words, there is no need to stop whatever is running (e.g., the wine process) in order to make the change. Event and action sequencing system 210 may handle making the change dynamically. Having said that, the change may alter operations to go to a different event state than what was originally programmed. See the differences between FIG. 1 and FIG. 7B. The next event states in FIG. 7B (step 243 and step 244) did not exist when FIG. 1 was initially ran.

Figure 6:
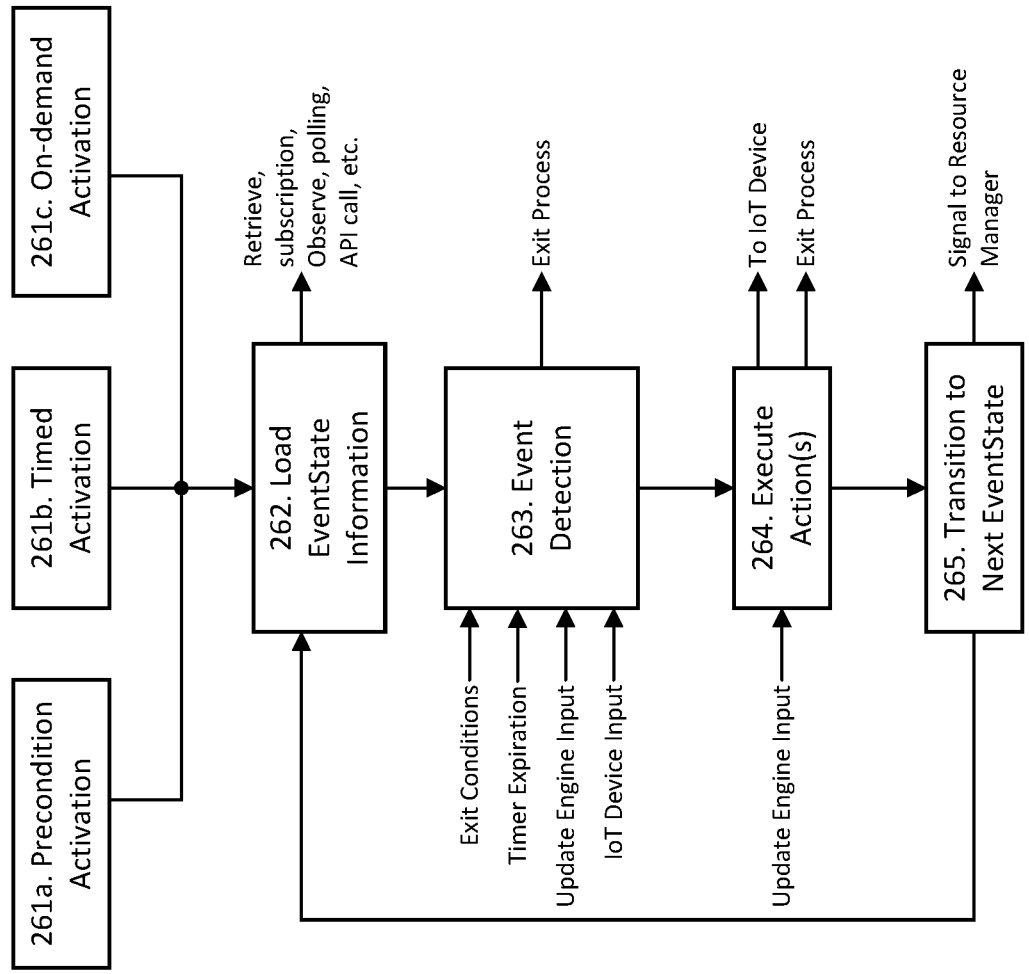
FIG. 6 illustrates an exemplary Execution Unit State Processing Flow.
Figure 16:
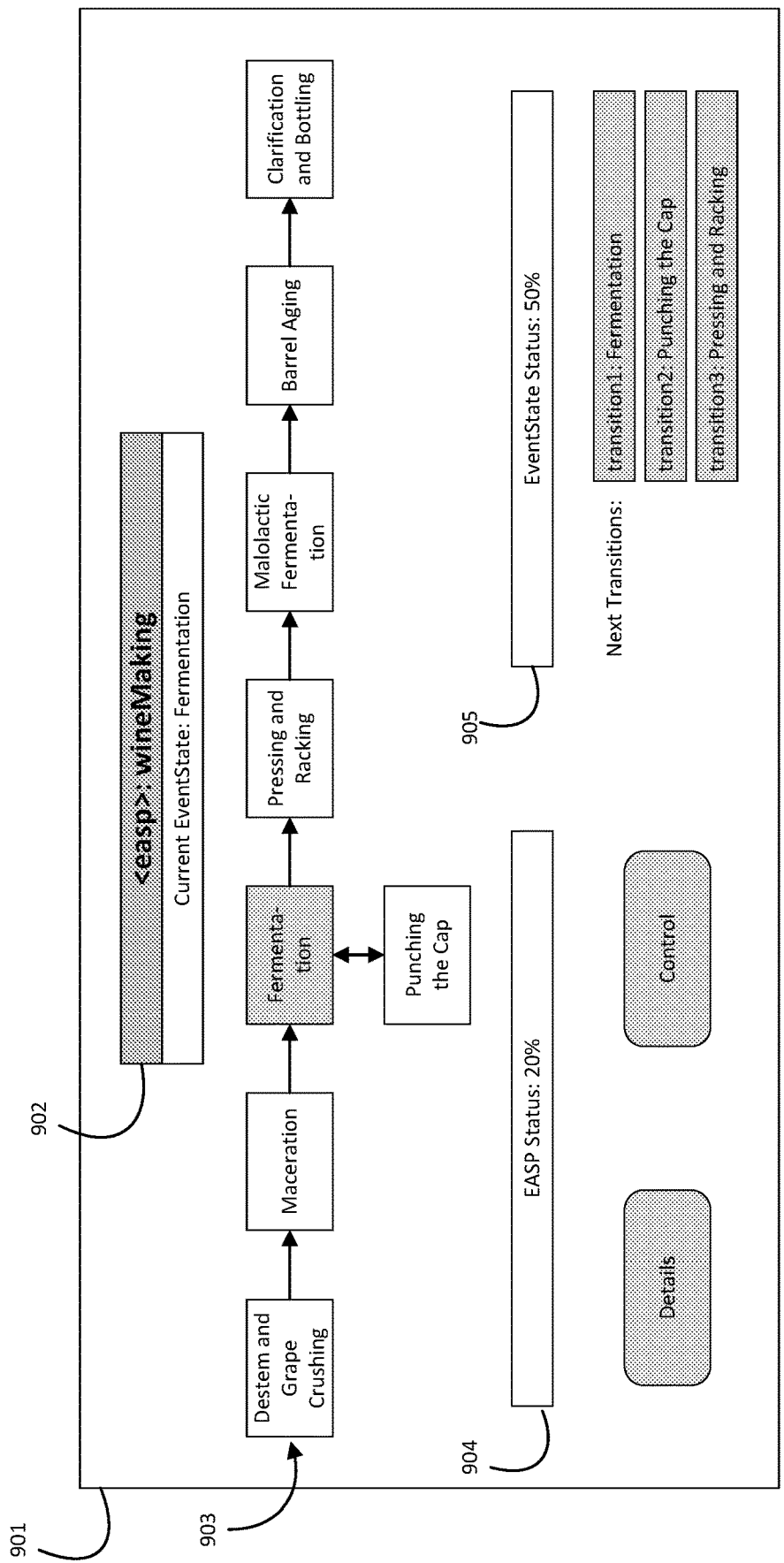
FIG. 16 illustrates an exemplary display with a oneM2M embodiment and the wine making process from FIG. 1.

FIG. 6 shows the processing procedure performed by execution unit 216 when the EASP is activated and running. Note that diagram only shows status information provided during the "transition to next EventState" step, but execution unit 216 may provide status information at any time during the entire state processing flow. Status information may include any information provided by the EASP system to indicate where the current EASP processing is at (e.g. a percentage complete), what event state is currently active, etc. Examples of status information are shown in FIG. 15 and FIG. 16.

FIG. 6 illustrates an exemplary execution unit state processing flow. At step 261a-261c there is activation. This is when execution unit 216 is triggered to commence processing. It may be triggered in various ways and FIG. 6 shows three potential ways: based on preconditions specified in EASP resource 217 (step 261a), based on a future time (step 261b), or based on the on-demand control of a requestor (step 261c—receiving a request to activate the EASP). The control parameter described in Table 1 provides additional ways the EASP may be activated. There may be cases where the EASP is not activated, e.g. when initially creating each of the EventState resources. In another scenario when the EASP is not active and should be activated, a user wants to only run the EASP during certain times of the day, while during other times, there is no benefit. At step 262, there may be a load of EventState Information. Once the EASP is activated, execution unit 216 initially loads information of the Initial EventState. On subsequent iterations of the processing flow, EventState resource 218 as identified by the Next EventState ID parameter is loaded instead. In addition, execution unit 216 may need to verify accesses to IoT devices can be made if this step was not already performed previously during the creation of the EventState resource. This may be achieved by making subscriptions to devices in the IoT system, using CoAP Observe, or polling the devices to provide input to the event state if the event and action sequencing system 210 and the IoT system are remotely located. For more integrated solutions, it may involve calling the appropriate API calls. If necessary, a timer may be started for event states that are executed for a time duration before moving to the next step.

With continued reference to FIG. 6, at step 263, there may be event detection. Once execution unit 216 is able to communicate to IoT devices 242 necessary for the operation of EventState resource 218 and all EventState resource parameters are saved locally, it begins monitoring the inputs to detect for potential transition events. At this point, the exit conditions and timer expiration inputs are also applied to the detection logic should they be enabled. If an exit event is detected, then execution unit 216 may exit the event state or even the EASP if it was configured so. Finally, execution unit 216 may also get an input from update engine 213 if a change to the EASP was made. When this occurs, execution unit 216 replaces the locally stored parameters with the ones provided by update engine 213. At step 264, there may be executed action(s). Upon the detection of events that triggers a transition, execution unit 216 may execute any actions that may be specified for the current event state to IoT devices or it may exit the event state or EASP. Once all actions have been completed, then it may move on to the next step. Note when an Update Engine Input is present, execution unit 216 should replace the stored parameters with those provided by the input. This may include any new actions that need to be performed as well as the ID of the next EventState resource 218 to transition to. This capability provides for the support of dynamically updating the operations of the EASP process.

At step 265, there may be transition to the next EventState resource 218. If a next EventState ID exists as part of Transition resource 219, execution unit 216 may perform the transition to step 262 to load information for the next EventState resource 218 specified by the next EventState ID. Execution unit 216 may signal to resource manager 214 the identifier of the next EventState resource 218 and other pertinent information for the transition, e.g. the current state, what trigger event was detected, etc. This signal may be used to detect potential race conditions that may exist when dynamically updating EASP operations. Race conditions occur whenever there is potential for two EventStates for the same trigger event. This can occur during updates to the EASP as described here. An example of this is when a resource manager 214 may check if the next EventState identifier matches the currently stored identifier if EventState resource 218 was recently modified by update engine 213.

Update Engine—Update engine 213 provides a mechanism for a requestor to update the EASP process while it is in operation. This update may be in the form of changing a transition event to even adding new event states to the EASP. Other changes that affect EASP operations may also be supported. Update engine 213 may coordinate with execution unit 216 to ensure the updates do not interfere with the operation of the EASP. If interference is detected, then update engine 213 will not enable the update and provide the necessary error response to resource manager 214, which will then relay the response to the requestor.

Figure 7A:
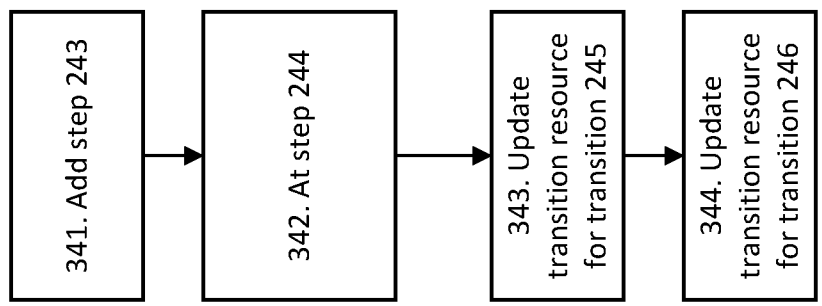
FIG. 7A outlines the steps that may be used to update the operations of the wine making process.
Figure 7B:
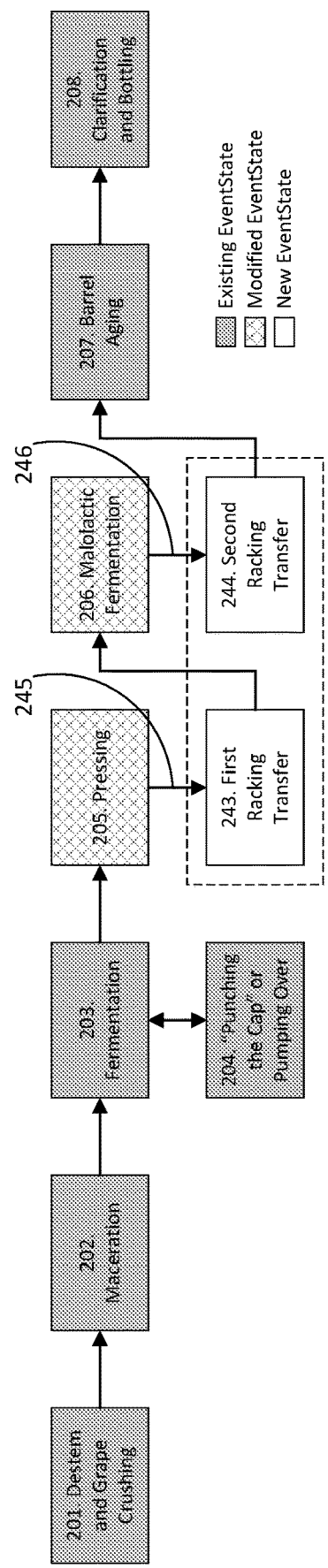
FIG. 7B illustrates an exemplary Use Case of Update Engine Utilization.

FIG. 7B illustrates an exemplary update to the wine making process from FIG. 1, in which the racking step (step 205) is divided into two separate steps to make a higher quality wine. The updates show how update engine 213 is utilized to enact changes to an EASP process that is already running. FIG. 7A outlines the steps that may be used to update the operations of the wine making process. At step 341, add a new "First Racking Transfer" step (step 243). At step 342, add a new "Second Racking Transfer" step (step 244). At step 343, update Transition resource 219 of the "Pressing and Racking" step (step 205) to transition (transition 245) to the newly created "First Racking Transfer" step (step 243). At step 344, update Transition resource 219 of the "Malolactic Fermentation" step (step 206) to transition (transition 246) to the newly created "Second Racking Transfer" step (step 244).

During the fermentation step, it was determined that the wine had good quality and would benefit from having two Racking steps. At this time, the wine maker creates the first and second racking transfer event states to the EASP as shown in FIG. 7B. Since the creation of these EventState resources 218 do not impact the existing operation, the create requests are successful. After the resources are created, event and action sequencing system 210 transitions the EASP to the (original) "Pressing and Racking" step shown in FIG. 1, which is now labeled as the "Pressing" step in FIG. 7B. The wine maker then sends a request to update the step by reconfiguring the action of transitioning to the "First Racking Transfer" step 243 instead of to the "Malolactic Fermentation" step 206. Update engine 213 evaluates the request and since it is only at the Event Detection stage (step 263) of FIG. 6 waiting for the wine to be completely pressed, it is able to inject new inputs to alter the processing flow and change the next EventState ID to "First Racking Transfer" step 243. When the wine pressing is completed, the new Update Engine input may direct the EASP to execute the action of racking the wine to another tank and transition to the "First Racking Transfer" event state.

Once the wine making process is in the "First Racking Transfer" event state, the wine maker may modify the transition events parameter of Transition resource 219 for the "Malolactic Fermentation" event state. The change involves redirecting the transition to the "Second Racking Transfer" step 244 instead of to the "Barrel Aging" step. The execute actions parameter may also be modified to pump the wine into a separate tank rather than pumping to the barrels for aging. This request is able to be processed successfully as the processing is still within the "First Racking Transfer" step 243.

Figure 8:
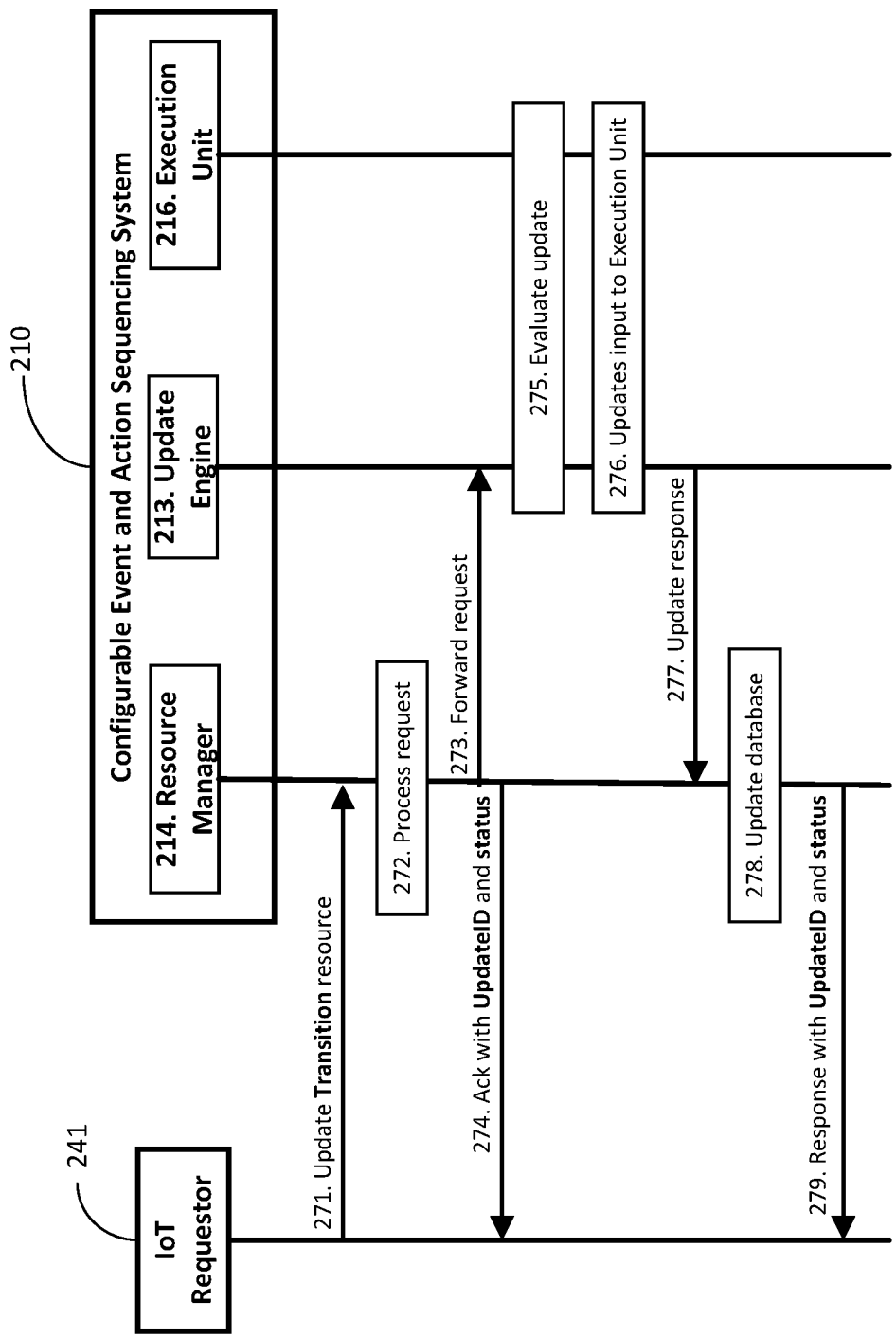
FIG. 8 illustrates an exemplary Update Engine Process Flow.

The overall procedure of update engine 213 is shown in FIG. 8. At step 271, IoT requestor 241 updates a Transition resource while the corresponding EASP process is actively running. As an example, IoT requestor 241 would like to change the transition events and next EventState ID parameters of Transition resource 219. Alternatively, IoT requestor 241 may create a new Transition resource 219 with different transition events and next EventState ID parameters than the values in the current Transition resource 219. Any of these cases may trigger the activation of update engine 213. In addition, creating or modifying an EventState resource will also trigger the operations of update engine 213. At step 272, resource manager 214 processes the request of step 271 and performs validations that are required by event and action sequencing system 210. At step 273, resource manager 214 recognizes that the EASP process is actively running and forwards the update request to update engine 213 for processing. At step 274, resource manager 214 returns an ACK response to inform the IoT Requestor that the update request is being processed and is pending a result from update engine 213. The response may include an UpdateID generated by resource manager 214 for tracking purposes. Other pertinent information may also be included, such as the status of the current state as well as the status of the overall EASP.

With continued reference to FIG. 8, at step 275, update engine 213 evaluates if the update may be made safely and not negatively affect operations (e.g., fatal error or other threshold error) by communicating with execution unit 216. If the update may be made safely, continue to step 276; otherwise go to step 277. The Transition resource (or attribute) may dictate how the EASP transitions to the next step. At step 276, if the update may be made without negatively affecting (e.g., fatal error or other threshold error) the operations of the EASP, update engine 213 adds the inputs to execution unit 216 to update the EASP operations as shown in FIG. 6. At step 277, update engine 213 returns an appropriate response to resource manager 214. At step 278, resource manager 214 updates database 215 with the information provided in the update request if update engine 213 returns a successful response. At step 279, resource manager 214 returns an appropriate response to IoT requestor 241 and may include the UpdateID from step 274 and an updated status. With regard to errors, it may depend on the implementation of the EASP. In FIG. 6, step 263 is responsible for detecting events that affect the EASP. If an update is made and the EASP is monitoring an event for Timer Expiration, the EASP is able to make the change. However, if other inputs are being monitored, then the EASP does not know when they will trigger. Therefore, the EASP may generate a "fatal error". Going back on the Timer Expiration, a "threshold error" may be generated if the Timer Expiration is about to expire when the update is received.

Additional Examples: Configurable Event and Action Sequencing system 210 (also referred to herein as Event and Action Sequencing system 210) may integrated into existing IoT architectures, such as oneM2M and OCF. Below, examples are provided for how event and action sequencing system 210 may be integrated into those architectures and the oneM2M examples are applied to the wine making use case disclosed herein. An industrial factory use case is also presented to show how the interactive control of EASPs may be realized using event and action sequencing system 210. Also herein, an example graphical user interface is shown (FIG. 15) that may represent a table returned to a user summarizing the steps of an EASP.

oneM2M has defined a service layer architecture in which common services functions (CSFs) offers services, such as data management, device management, etc. to applications. These CSFs are combined together into a Common Services Entity (CSE) that may run on a cloud server, a gateway device, or even on a mobile device. Applications may then register to use the services offered by the CSE. Configurable Event and Action Sequencing system 210 may then be integrated into the CSE as one of the services that is offered. In effect, event and action sequencing system 210 itself may be one of the CSFs.

Once event and action sequencing system 210 is integrated, the disclosed resources for EASP resource 217, EventState resource 218, and Transition resource 219 may then be added to the oneM2M architecture. Table 4 and Table 5 list the child resources and resource specific attributes respectively for the disclosed <easp> resource.

TABLE 4

Child Resources of Disclosed oneM2M <easp> Resource

| Child Resources of <easp> | Child Resource Type | Description | <easpAnnc> Child Resource Types |
|---|---|---|---|
| [variable] | <eventState> | This resource describes the details of a particular state that is triggered by an event of an EASP process | <eventState>, <eventStateAnnc> |
| [variable] | <subscription> | See clause 9.6.8 in TS-0001 oneM2M Functional Architecture, V-3.4.0 [1] | <subscription> |

TABLE 5

Attributes of Disclosed oneM2M <easp> Resource

| Attributes of <easp> | Description | <easp> Attributes |
|---|---|---|
| easpID | An ID of the resource that includes information about an EASP process | MA |
| description | Text format description of the EASP process | OA |
| currentStatus | The overall status of the EASP process | OA |
| control | This attribute specifies how the EASP process is controlled: automatic, enable on-demand, enable time delayed, disable, exit immediately, exit on end of event state or percent complete, pause, resume, reset, etc. When in automatic mode, the preconditions attribute may be used to turn on the EASP process. | OA |
| preconditions | This attribute specifies any preconditions that should be met in order for the EASP to begin. It may be used to trigger the start of the EASP when in automatic mode. | OA |
| exitConditions | This attribute determines what events may end the EASP process. It is to allow for the premature, asynchronous exit of the EASP. It may be associated as a "stop immediate" command to disregard all other inputs and stop the operation of the EASP. | OA |
| numberEventStates | The number of event states defined for the <easp> resource | OA |
| initialEventState | The eventStateID of the initial event of the EASP process | OA |
| finalEventState | The eventStateID of the last event in the EASP process | OA |

Table 6 and Table 7 list the child resources and resource specific attributes respectively for the newly disclosed <eventState> resource. Note that the transitionEvents attribute is specified here as a potential way to specify state transitions. An alternate method is to put the information about event state transitions in a <transition> resource as shown in Table 8 and Table 9.

TABLE 6

Child Resources of Disclosed oneM2M <eventState> Resource

| Child Resources of <eventState> | Child Resource Type | Description | <eventStateAnnc> Child Resource Types |
|---|---|---|---|
| [variable] | <transition> | This resource describes the details of event conditions that will trigger a transition to another event state along with the ID of the next event state. Actions may also be specified to be performed as a result of the transition. | <Transition>, <TransitionAnnc> |
| [variable] | <subscription> | See clause 9.6.8 in [1] | <subscription> |

TABLE 7

Attributes of Disclosed oneM2M <eventState> Resource

| Attributes of <eventState> | Description | <eventStateAnnc> Attributes |
|---|---|---|
| eventStateID | An ID of the resource that includes information about the current event state | MA |
| currentStatus | The status for the current event state | OA |
| timeDuration | The time this event state is specified to operate for | OA |
| exitConditions | Event definition(s) that will trigger the exit of the event state. The definition should include whether the EASP exits completely or specify the next eventState to transition to. | OA |

TABLE 7-continued

Attributes of Disclosed oneM2M <eventState> Resource

| Attributes of <eventState> | Description | <eventStateAnnc> Attributes |
|---|---|---|
| transitionEvents | An expression that specifies the conditions that triggers an eventState transition. This attribute works in conjunction with both transitionActions and nextEventStateID attributes. | OA |
| transitionActions | The action(s) that is being performed in this event state. This attribute may be specify as a single action, a list of actions, or no actions to be performed while in the current event state. | OA |
| nextEventStateID | The ID of the next event state to transition to if the events in transitionEvents occur | |

Table 8 and Table 9 list the child resource and resource specific attributes respectively for the newly disclosed <transition> resource. Note that the presence of <transition> resource may remove the need for the transitionEvents, transitionActions, and nextEventStateID attributes of the <eventState> resource and vice versa.

TABLE 8

Child Resources of Disclosed oneM2M <transition> Resource

| Child Resources of <transition> | Child Resource Type | Description | <transitionAnnc> Child Resource Types |
|---|---|---|---|
| [variable] | <subscription> | See clause 9.6.8 in [1] | <subscription> |

TABLE 9

Attributes of Disclosed oneM2M <transition> Resource

| Attributes of <transition> | Description | <transitionAnnc> Attributes |
|---|---|---|
| transitionEvents | Event definition(s) that will trigger a transition to another event state | OA |
| executeActions | The action(s) that is/are executed as part of the event state transition. The actions may be in the form of a device management command, the execution of a oneM2M request (create a specific resource), etc. | OA |
| nextEventStateID | The ID of the next eventState resource to transition to if the transition events occur | OA |

Figure 9:
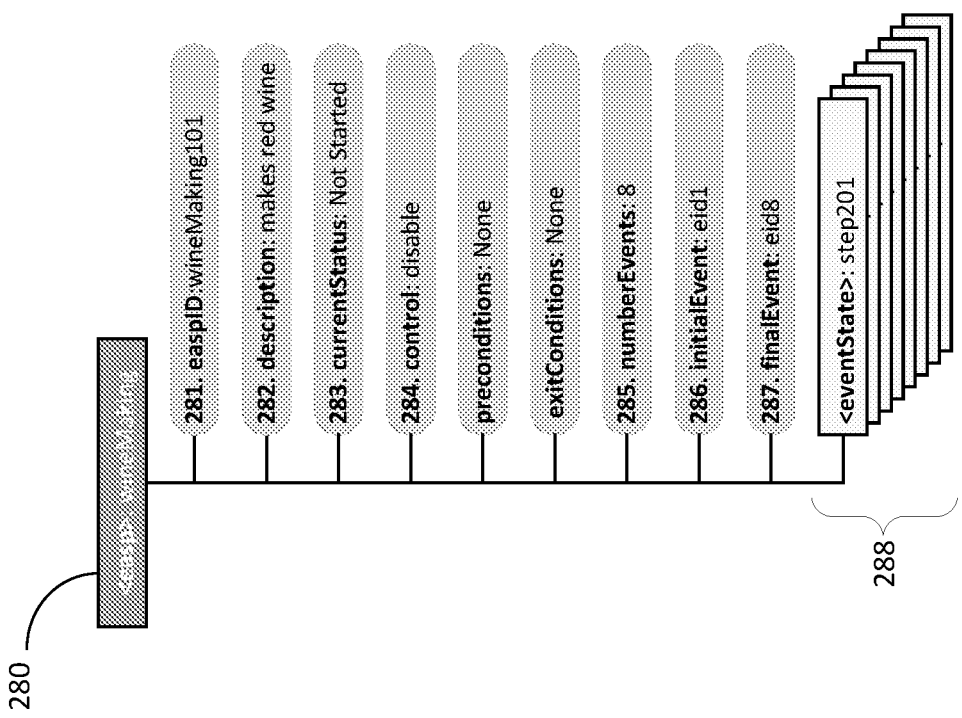
FIG. 9 illustrates an exemplary oneM2M <easp> Resource for Wine Making Use Case.

FIG. 9 shows an example of the disclosed <easp> resource 280 for the wine making use case. In this example, the wine making process is realized as an EASP represented by an <easp> resource. Hence, the wine making process and the EASP may be used interchangeably. The <easp> resource is named "wineMaking" and its attributes and child resources are listed below. This resource is first created on the CSE by the wine maker to capture the steps required in the wine making process. Preconditions, exitConditions, and other attributes 281-287 are shown in FIG. 9. FIG. 9 shows the representation of the <easp> resource 280 after the event states are created, hence the numberEvents attribute 285 is "8", the initialEvent attribute 286 is "eid1", and the finalEvent attribute 287 is "eid8". The EASP is not yet started and both the control attribute 284 and the currentStatus attribute 283 reflect this with values of "disable" and "Not Started", respectively. There are no preconditions events and no exitConditions events, as the wine maker may interactively control the EASP using the control attribute 284. It is contemplated that what is referred as an attribute (e.g., finalEvent attribute) may be a resource and vice versa in some implementations.

Figure 10:
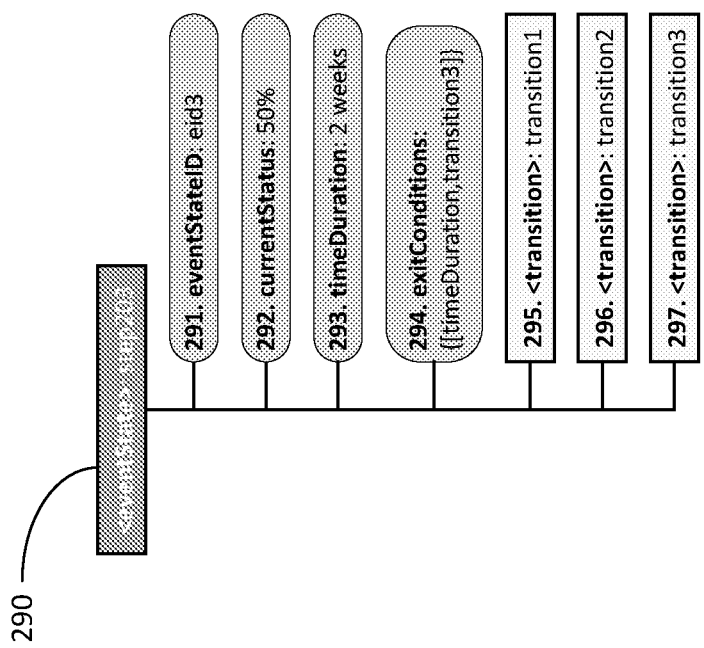
FIG. 10 illustrates an exemplary oneM2M <eventState> Resource for Wine Making Use Case.
Figure 11:
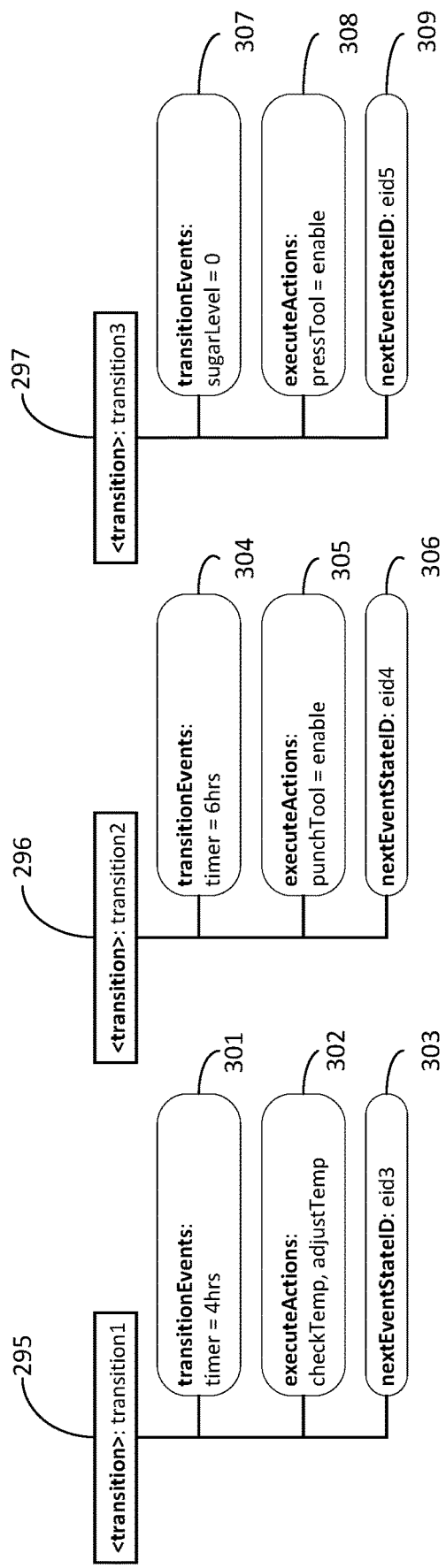
FIG. 11 illustrates an exemplary oneM2M <transition> Resources for Wine Making Use Case.

Once the <easp> resource 280 is created, the wine maker then creates the eight <eventState> resources 288 as child resources of <easp> resource 280. Each <eventState> resource 288 has the name "step #" where # is the number of the step within the wine making process and an eventStateID of "eid #", again the # is associated with the step number. FIG. 10 shows an example of the <eventState> resource 290 for step 203, the fermentation step. The currentStatus is at 50% for a timeDuration of 2 weeks, which means the fermentation process has already elapsed for 1 week. The values shown here are high-level exemplary representations and may not reflect the actual value. For example, the timeDuration attribute may have a value in seconds instead of the human readable label "weeks". Within the event state for step 203, there are 3 <transition> resources (e.g., transition1 resource 295, transition2 resource 296, transition3 resource 297) that dictate what actions are performed when their respective transition event occurs.

The exitConditions attribute 294 provides a mechanism to override any of the transition events should they not occur. This mechanism may be use to prevent cases where an event state is stuck and remaining in the event state will result in undesirable operations. For example, the fermentation of the wine is limited to 2 weeks or when the sugar level reaches zero, whichever occurs first. Specifying an exit condition guarantees the step will eventually end even if the sugar level never reaches zero. Each entry in the exitConditions attribute 294 includes two values: the first value specifies the exit event and the second value specifies the transition resource where the executeActions and nextStateEventID are specified. This is one realization of the mechanism but other mechanisms may be implemented to specify explicitly the actions and nextEventStateID. The attribute may even support multiple exit conditions by using a complex data type.

Within the <eventState> step 203, one of three transition events may occur during the two-week fermentation period. Transition) event is performed every 4 hours to measure the temperature and adjustments are made if the value falls outside an indicated range. The event is triggered by the expiration of a timer that is set initially when step 203 began and the actions taken are checkTemp and adjustTemp. Both the events and actions may be captured by mechanisms provided in TR-0021 Study of the Action Triggering in M2M, V-0.5.0 [2] or it may be a simple expression specified as a key-value pair separated with an operator, such as "<resource_URI> <operator> <value>". Complex expressions may be created using logical operators to combine the simple expressions. The nextEventStateID attribute specifies the next event state to transition to. For transition) event, the EASP remains in the current step after performing the action specified.

Transition2 event occurs every 6 hours during the fermentation period. This event enables the punch tool to mix the must into a homogenous state for more uniform fermentation. For transition2 event, the EASP moves to step 204, where the punch tool is configured to run for 5 minutes before returning to the fermentation step—refer to FIG. 15 for the details. Finally, transition3 event detects the end of the fermentation period when the sugar level reaches zero. In response, the action of turning on the press tool is executed and the EASP moves on to step 205.

During the fermentation period, the wine maker tastes the wine to monitor its development. During this time, the wine maker may elect at the last minute to perform the racking procedure at two separate times to produce a higher quality wine. This involves racking the wine before and after the Malolactic Fermentation step 206 as shown in FIG. 7B. Since the original wine making process in FIG. 1 had combined the pressing and racking procedures together in step 205, this decision requires an update to the EASP flow. The wine maker first adds the new step 243 and step 244 to capture each of the two racking procedures. Then, the wine maker updates the transition resource 295 of step 205, while the pressing procedure is running. This update may safely be integrated by update engine 213 as the pressing is not yet complete. The update, shown with regard to rack) and rack 2 in FIG. 15, overrides the existing transition event and bypasses the racking procedure in step 205. Instead, the new transition will go to step 243 to perform the first racking procedure.

As the first racking transfer (step 243) is occurring, the wine maker updates transition resource 297 to start the second racking transfer (step 244) as shown in FIG. 15 for the transition 297 resource of step 206. Once in step 243, the wine is allowed to settle for 24 hours and the actions of removing the lees1 (called the gross lees) and the addition of bacteria for fermentation follows. At this point, the EASP continues to step 206 where the Malolactic Fermentation occurs for up to 6 weeks. Similar to step 203, the Malolactic Fermentation has an exit condition where the fermentation level is zero or the time duration of 6 weeks has expired. Any of these conditions will force the EASP to continue on to step 244 where the second racking transfer is enabled.

Within the second racking transfer, the three transition resources are linked together to follow each other. Transition) captures the event when the racking procedure is complete as indicated by the tank level being at zero. The EASP continues into transition2 event as indicated by the expression "transition1=done". The actions executed in transition2 is to check various levels of the wine and adjust them as necessary. These actions may be captured by another EASP to check and adjust the levels of total acidity, pH, etc. Finally, when the levels are properly adjusted, the EASP to remove the fine lees commences and once finished, the EASP proceeds to the barrel aging step.

The barrel aging step may take up to a year or more and therefore, the wine maker has specify an exitConditions attribute value of "[control,transition2]". It should be understood that each <transition> resource is associated with its <eventState> resource—e.g. transition2 from eventState eid3 (labeled 296) is different than this transition2 resource for eventState eid7. This exit condition is based on the control attribute of the <easp> resource 280 and is determined by the wine maker tasting the wine. The wine maker may abruptly end this step by explicitly changing the control attribute of <easp> resource 280. Otherwise, the wine maker may let the aging process end at the specified timeDuration. The EASP then continues to the last step of clarification and bottling. The clarification and bottling procedures consist of three main events: turning on the clarification filter in transition1 resource, turning off the clarification filter and turning on the bottling process in transition2 resource, and finally, turning off the bottling process in transition3 resource. This reference is relative to eid8 and not eid3. This applies to transition2 and transition3 resources.

Figure 12:
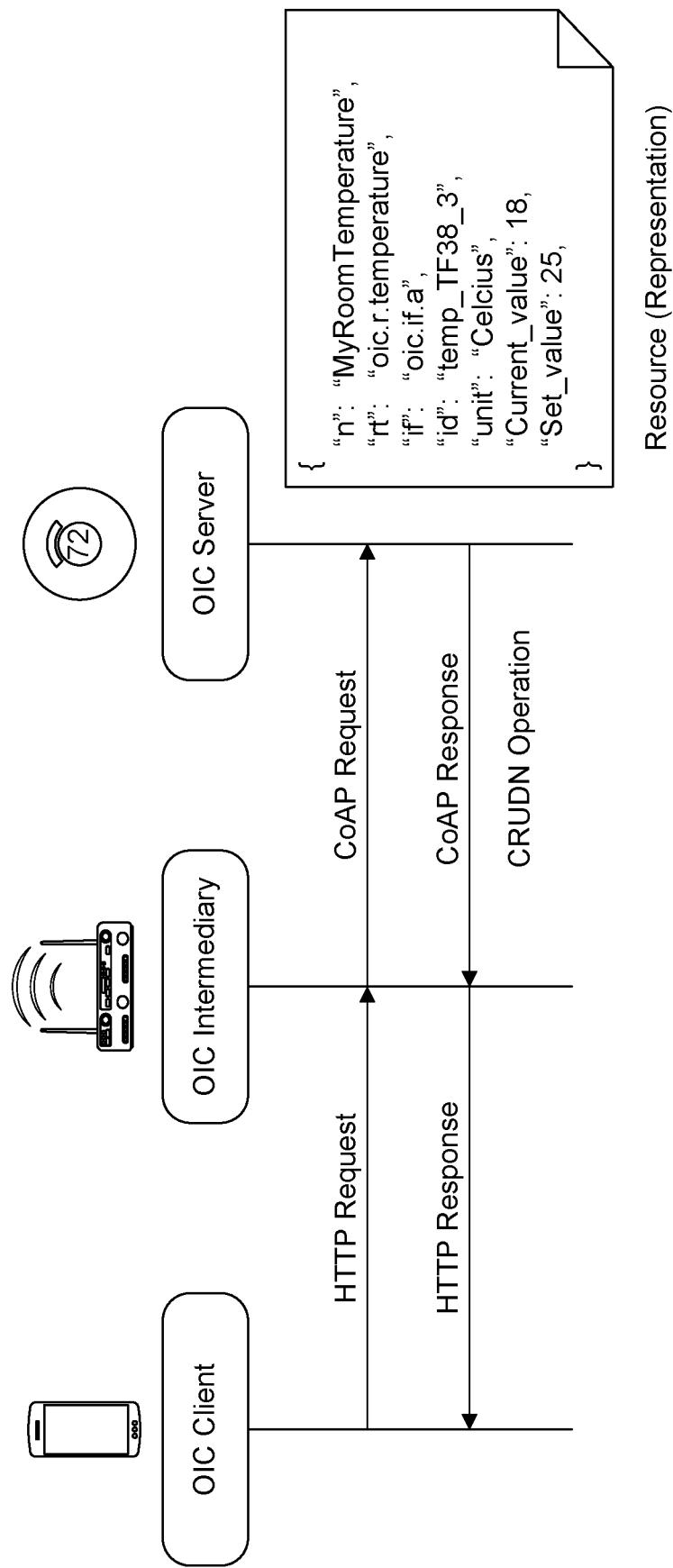
FIG. 12 illustrates an exemplary OCF Architecture Example of Roles.

Open Connectivity Forum—Open Connectivity Forum (OCF) is another IoT architecture similar to oneM2M in defining service layer functionalities for IoT devices to communicate with each other. In OCF (e.g., OIC Core Specification, v1.1.0 [3]), the resources themselves are hosted locally on OIC Servers unlike oneM2M which hosts device resources centrally on the CSEs. However, OCF has defined an OIC Intermediary that may be realized as a gateway device. FIG. 12 shows an example of the entity roles defined by OCF. An OIC Client makes a request to an OIC Server through the assistance of an OIC Intermediary. The OIC Intermediary may have access to multiple device resources and as a result, it may utilize the EASP process functionality disclosed herein. Therefore, Configurable Event and Action Sequencing system 210 may be integrated as part of the gateway to offer the services disclosed herein. It has access to various IoT devices and their resources with which IoT processes may be defined and used to monitor and control those devices.

OCF defines mechanisms for automating tasks through the use of scenes, rules, and scripts. While these resources offer event management-like operations, their functionality is currently limited to only detecting certain events are true and then executing scripts to perform some automated tasks. To update these resources would involve quite a bit of rework to enable the EASP process functionality disclosed herein. As a result, new OIC resources will be introduced here as OCF examples.

New OCF resource types may be defined as shown in Table 10. These resource types define a structure similar to the one shown in FIG. 3, but specified to fit within the OCF specification. At the top level is the oic.wk.easplist resource type, which is a collection resource to host child oic.wk.easp resources. The child oic.wk.easp resources are the same as the EASP resource disclosed above. Finally, the oic.wk.eventState resource are child resources of oic.wk.easp and represents the EventState resource of an EASP process. The Transitions resource will then be realized as an OCF resource property as outlined below. Note the resource types disclosed uses the "oic.wk" prefix—an alternative prefix "oic.r" could be used as well to specify OIC resource types. Another thing to note is the introduction of the oic.if.easp interface, which offers specialized representation of the EASP process to a requestor and described later. The new resource types may also support other OCF defined interfaces, but they are not listed for brevity.

TABLE 10

Disclosed OCF EASP Resource Type Definitions

| Predefined URI | Resource Type Title | Resource Type ID | Interfaces | Description | Related Functional Interaction |
|---|---|---|---|---|---|
| /EASPListResURI | EASP collection | oic.wk.easplist | oic.if.easp | EASP collection resource | EASP Process |
| /EASPResURI | EASP resource | oic.wk.easp | oic.if.easp | EASP instance resource | EASP Process |
| /EASPMemberResURI | eventState resource | oic.wk.eventState | oic.if.easp | EASP event state resource | States of EASP |

Table 11 shows the disclosed properties for the oic.wk.easplist resource. The majority of the properties are provided to support OIC collection resources. The nf property provides status information about the collection and indicates how many oic.wk.easp resources (IoT processes) are found in this collection. This information may be used for managing the collection and also determine the load of event and action sequencing system 210.

TABLE 11

Disclosed oic.wk.easplist Resource Properties

| Property name | Value type | Description |
|---|---|---|
| links | array | Array of OIC Links. In addition to properties required for an OIC Link, the identifier for that link in this set is also required. |
| n | string | User friendly name of the collection |
| id | object | The ID of the easplist collection resource |
| di | string | The device ID which is an UUIDv4 string; used for backward compatibility with Spec A definition of /oic/res |
| rts | string | Defines the list of allowable resource types (for Target and anchors) in links included in the collection; new links being created may only be from this list |
| drel | string | When specified this is the default relationship to use when an OIC Link does not specify an explicit relationship with "rel" parameter |
| nf | integer | The number of oic.wk.easp resources included in this collection |

Table 12 shows the disclosed properties for the oic.wk.easp resource. These properties represent the parameters of the <easp> resource 280 as described above. These properties have the same functionalities as specified above.

TABLE 12

Disclosed oic.wk.easp Resource Properties

| Property name | Value type | Description |
|---|---|---|
| easpID | string | An identifier for the oic.wk.easp resource, which should be unique within the domain of event and action sequencing system 210. |
| description | string | A human readable text describing the operations of the EASP. |

TABLE 12-continued

Disclosed oic.wk.easp Resource Properties

| Property name | Value type | Description |
|---|---|---|
| currentStatus | string | The current status of the EASP - may be specified as a percentage. |
| control | string | A value to specify explicit control of the EASP; values may be automatic, enable on-demand, enable time delayed, disable, exit immediately, exit on end of event state or percent complete, pause, resume, reset |
| preconditions | array | A list of preconditions that must be met in order for the EASP to begin operation. |
| exitConditions | array | Events that will trigger the exit of the EASP asynchronously - may be used when in automatic mode to specify conditions to exit the EASP upon detection of certain conditions. |
| numEventStates | integer | The number of states in the EASP |
| initialEventState | string | Specifies the eventStateID of the first event state in the EASP . |
| finalEventState | string | Specifies the eventStateID of the last event state in the EASP process. |

Table 13 shows the disclosed properties for the oic.wk.eventState resource. These properties represent the parameters of the <eventState> resource as described above. Note in this case, the transitions parameter is represented as an OIC property rather than a child resource of oic.wk.eventState. It still offers the same functionalities for determining state transitions as the transitions resource.

TABLE 13

Disclosed oic.wk.eventState Resource Properties

| Property name | Value type | Description |
|---|---|---|
| eventStateID | string | An identifier for the oic.wk.eventState resource that should be unique within the oic.wk.easp resource. |

TABLE 13-continued

Disclosed oic.wk.eventState Resource Properties

| Property name | Value type | Description |
|---|---|---|
| currentStatus | string | The current status of the event state - may be specified as a percentage. |
| timeDuration | string | If specified, a time duration that the event state must remain in. Upon the expiration of the time, the event state will transition to the specified next event state. |
| exitConditions | array | Events that will trigger the exit of the event state asynchronously - may be used when in automatic mode to specify conditions to exit the event state upon detection of certain events. |
| transitionEvents | array | Event definition(s) that will trigger a transition to another event state |
| transitionActions | array | A list of actions that are executed while the EASP is in this event state. The list may be empty to signify no actions are performed. |
| nextEventStateID | string | The eventStateID of the next event state to transition to |

One unique OCF feature is the concept of OCF Interfaces, which is defined as a view into an OCF resource. In OCF, an interface defines what types of requests and responses are allowed when accessing that resource. For example, the OCF oic.if.baseline interface allows both retrieve and update requests to be made to a resource and the responses include the full representation of the resource including the meta properties. Table 14 shows a list of OCF interfaces. The oic.if.r interface, on the other hand, limits requests to only retrieve properties of the resource. Using this interface concept, a new OCF interface oic.if.easp may be created to allow for providing different responses depending on the provided query string in the request. This interface will then allow the device to return one of the disclosed responses described in the operation of resource manager 214: the current representation, the current EASP and event state status, and the entire EASP structure. Additional response data may also be provided by this interface as required by event and action sequencing system 210. A new oic.if.easp interface may be defined and added to Table 14 to provide these specialized responses.

TABLE 14

New OCF oic.if.easp Interface Definitions

| Interface | Name | Applicable Method | Description |
|---|---|---|---|
| baseline | oic.if.baseline | RETRIEVE, UPDATE | The baseline Interface defines a view into all Properties of a Resource including the Meta Properties. This Interface is used to operate on the full Representation of a Resource. |
| links list | oic.if.ll | RETRIEVE | The 'links list' Interface provides a view into Links in a Collection (Resource). Since Links represent relationships to other Resources, the links list interfaces may be used to discover Resources with respect to a context. The discovery is done by retrieving Links to these Resources. For example, the Core Resource /oic/res uses this Interface to allow discovery of Resource "hosted" on a Device. |
| batch | oic.if.b | RETRIEVE, UPDATE | The batch Interface is used to interact with a collection of Resources at the same time. This also removes the need for the Client to first discover the Resources it is manipulating - the Server forwards the requests and aggregates the responses. |
| read-only | oic.if.r | RETRIEVE | The read-only Interface exposes the Properties of a Resource that may be 'read'. This Interface does not provide methods to update Properties or a Resource and so may only be used to 'read' Property Values. |
| read-write | oic.if.rw | RETRIEVE, UPDATE | The read-write Interface exposes only those Properties that may be both 'read' and 'written' and provides methods to read and write the Properties of a Resource. |
| actuator | oic.if.a | CREATE, RETRIEVE, UPDATE | The actuator Interface is used to read or write the Properties of an actuator Resource. |
| sensor | oic.if.s | RETRIEVE | The sensor Interface is used to read the Properties of a sensor Resource. |
| easp | oic.if.easp | RETRIEVE | The easp Interface is used to read the characteristics of an EASP: full representation of the current easp Resource, the status of both the EASP and the current event state, and the structure of the entire EASP. |

Figure 13:
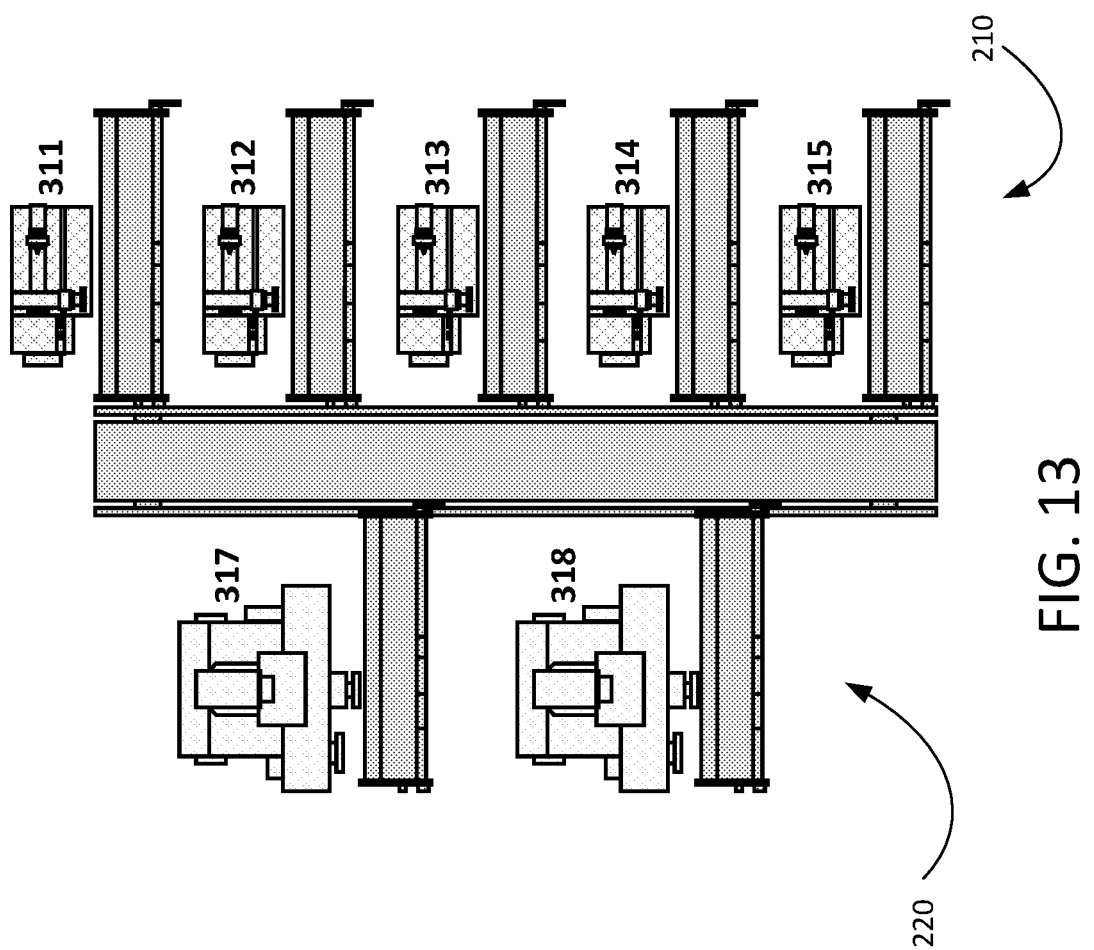
FIG. 13 illustrates an exemplary Industrial Factory Use Case.

Industrial Factory—In an industrial factory, assembly lines are manned by robots that perform certain functions. There are multiple stations sequenced together to manufacture the end product. FIG. 13 shows two such stations interconnected together—the output of stations 220 (station 317 and station 318) is the input to stations 210 (station 311-station 315). Stations for station 220 may output at a rate of five units per hour and stations for station 210 may receive inputs at a rate of two units per hour. The stations are tuned to minimize the time that the robots remain idle to maximize productivity.

The factory implements the configurable event and action sequencing system 210 disclosed herein and an EASP is created to control each of the stations shown. Each EASP process has multiple event states and the event states are controlled using the time duration parameter to ensure each station outputs at the desired rate. An administrator to event and action sequencing system 210 has full access to each of the IoT processes and may interactively control them as necessary. In addition, each robot provides diagnostics of its operation so the administrator may monitor the output of each station.

Figure 14:
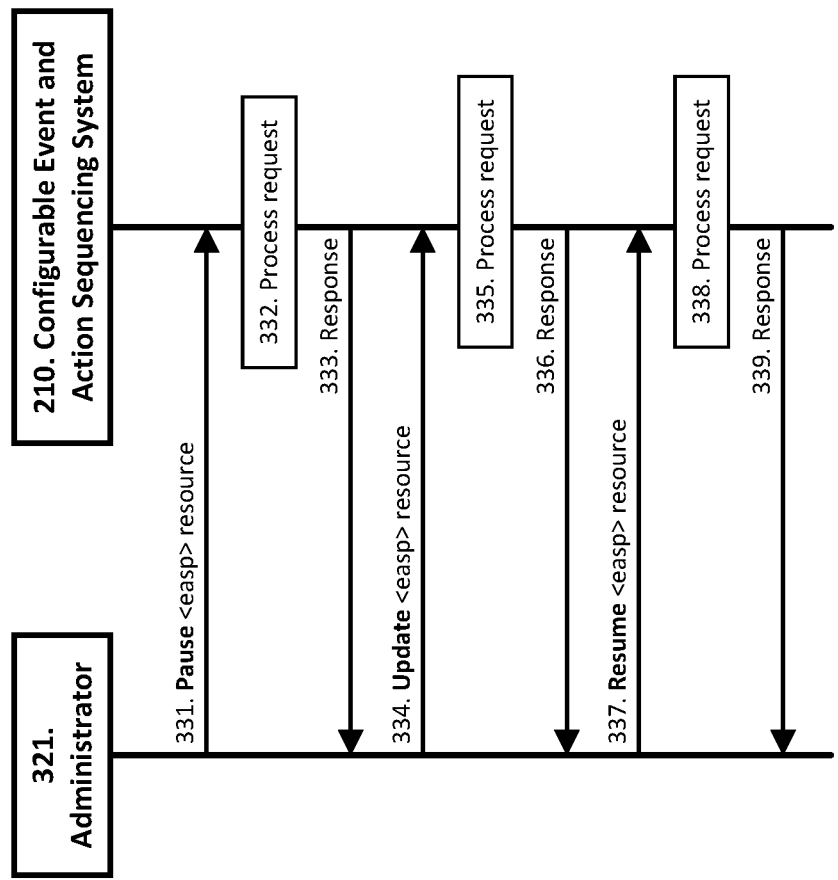
FIG. 14 illustrates an exemplary Interactive Control of EASP Resource.

Station 311 may contain an older robot that had operated reliably but is exhibiting signs of failures recently. During one shift, station 311 sends diagnostic information that one of its components is not working properly. In response, the administrator sends a request to change the control parameter of EASP resource of station 311 to "exit immediately" to shut down the station. Then the administrator reprograms the IoT processes of stations 317 and station 318 to output at a slower rate to account for station 311 being shut down. FIG. 14 shows the call flow executed by the administrator to interactively control each of the IoT processes of station 317 and station 318.

FIG. 14 illustrates an exemplary Interactive Control of an EASP process. At step 331, administrator 321 sends an update request targeting EASP resource (e.g., EASP resource 217) of station 317 to pause the EASP. The control parameter is set to 'Pause' in this case. At step 332, within event and action sequencing system 210, resource manager 214 sends a signal to execution unit 216, which is part of configurable event and action sequencing system 210, to suspend the operation of the current event state. Execution unit 216 may stop the timer that is controlling the execution of the event state and stop any actions that may be performing. At step 333, event and action sequencing system 210 may return a response indicating the EASP was paused. Administrator 321 may repeat step 331-step 333 for the EASP of station 318. At step 334, administrator 321 adjusts the time duration parameters of EASP resource of station 317 to output at a rate of four units per hour. The administrator performs this request for multiple EventState resources (e.g., EventState resource 218) as necessary.

With continued reference to FIG. 14, at step 335, resource manager 214 makes the appropriate changes to the EventState resources of EASP resource of station 317. For the current event state, resource manager 214 may signal the change directly to execution unit 216. Alternatively, resource manager 214 may forward the change to update engine 213 to update the existing event state. For the inactive EventState resources, resource manager 214 may simply update database 215 of the corresponding EventState resource. At step 336, event and action sequencing system 210 returns a response indicating the change was made. The administrator may repeat step 334-step 336 for the EASP of station 318. At step 337, once all the time duration parameters are changed, the administrator sends a "resume" request to restart operations of station 317. This may entail sending a request where the control parameter is set to 'resume'. At step 338, resource manager 214 sends a signal to execution unit 216 to restart operations of the current event state. At this point, the timer will reflect the change that was made in step 334-step 336 in slowing down the production. At step 339, event and action sequencing system 210 returns a response indicating the EASP was restarted. The administrator may repeat step 337-step 339 for the EASP of station 318.

User Interface—FIG. 15 shows an example user interface the Configurable Event and Action Sequencing Framework 210 may provide to show the information of an EASP process in tabular form. The table here shows the eventStates in the wine making use case described above and may be presented over a web interface. The information in the table may be retrieved from event and action sequencing system 210 using the query interface for specifying the response data to be returned. In this case, it may be specified to return the EASP resource structure as well as the status of the EASP and of the current event state. Within the table, the current event state is eid5 (bold). The table may be color-coded. For example, existing event states may be in black, and newly added event states (while the EASP is running) may be in light blue. The text for the currentStatus attribute may be color-coded to give a quick visual representation to the wine maker. Red text may represent the current updates to the EASP of existing attributes that were made.

Once the <easp> resource has been created, it may be saved for future use and adjusted for other wine types. The wine maker may experiment with different fermentation times and add or remove event states as necessary to account for different grape varietals. Since fermentation may vary from batch to batch, the ability for the wine maker to adjust the operations of the EASP is critical to produce the best tasting wine possible.

FIG. 16 illustrates an exemplary display (e.g., graphical user interface) that may be generated based on the methods and systems discussed herein. Display interface 901 (e.g., touch screen display) may provide a snapshot view of an EASP process. The title of the display interface 902 shows the names and current event state respectively of the EASP. Underneath the title is a high level flow 903 of the overall EASP process with the current event state highlighted. At the bottom of the display interface are status information for both the EASP process 904 and the current event state 905. For the EASP process status 904, Details and Control buttons allow a user to view and possibly update the EASP process. For the current event state status 905, a listing of all the next transitions is displayed to show the user the possible transitions out of the current event state.

Figure 17A:
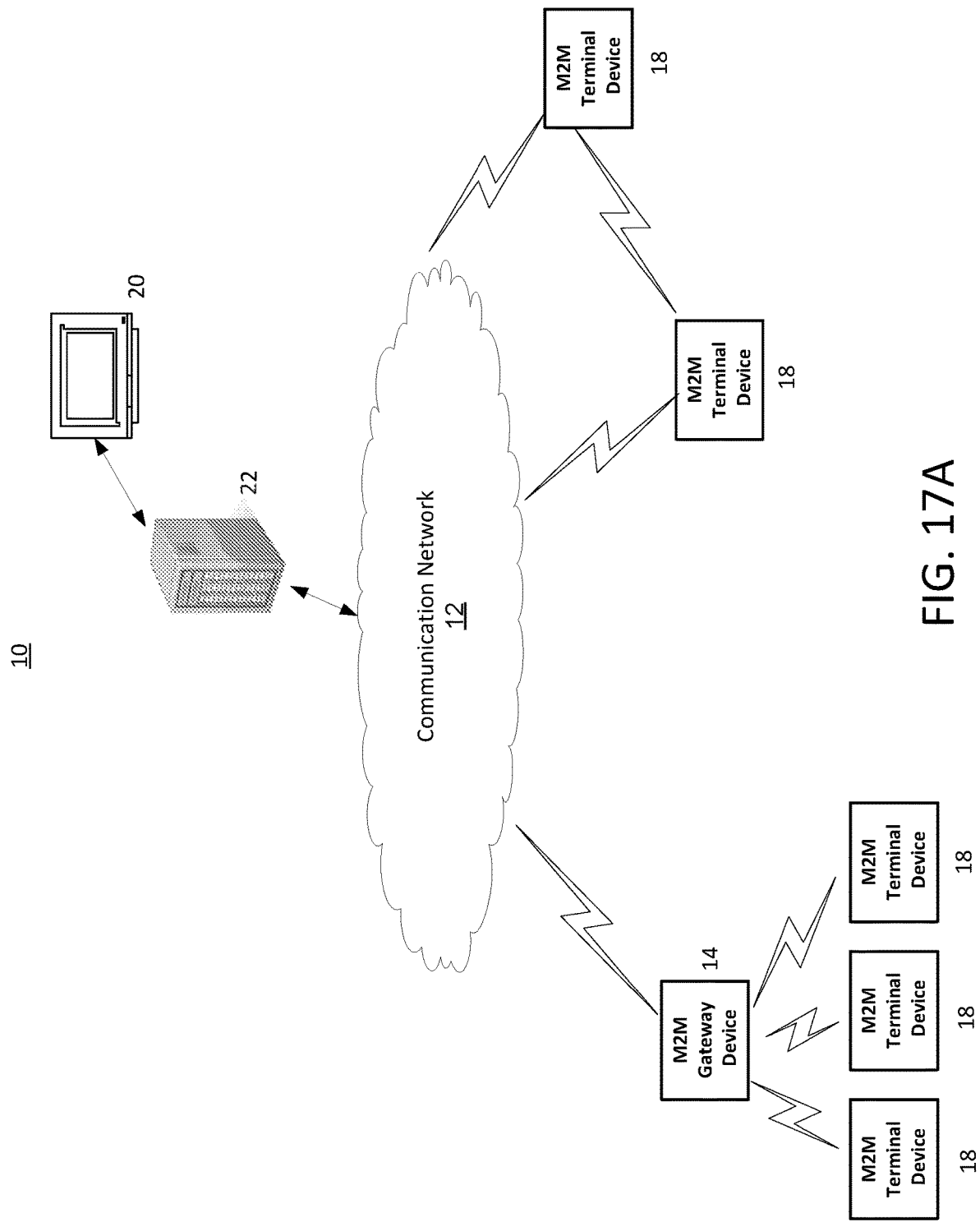
FIG. 17A illustrates an exemplary machine-to-machine (M2M) or Internet of Things (IoT) communication system in which the disclosed subject matter may be implemented.

FIG. 17A is a diagram of an example machine-to machine (M2M), Internet of Things (IoT), or Web of Things (WoT) communication system 10 in which one or more disclosed concepts associated with event and action sequencing system 210 may be implemented (e.g., FIG. 2-FIG. 15 and accompanying discussion). Generally, M2M technologies provide building blocks for the IoT/WoT, and any M2M device, M2M gateway or M2M service platform may be a component of the IoT/WoT as well as an IoT/WoT service layer, etc.

As shown in FIG. 17A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 17A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Figure 17B:
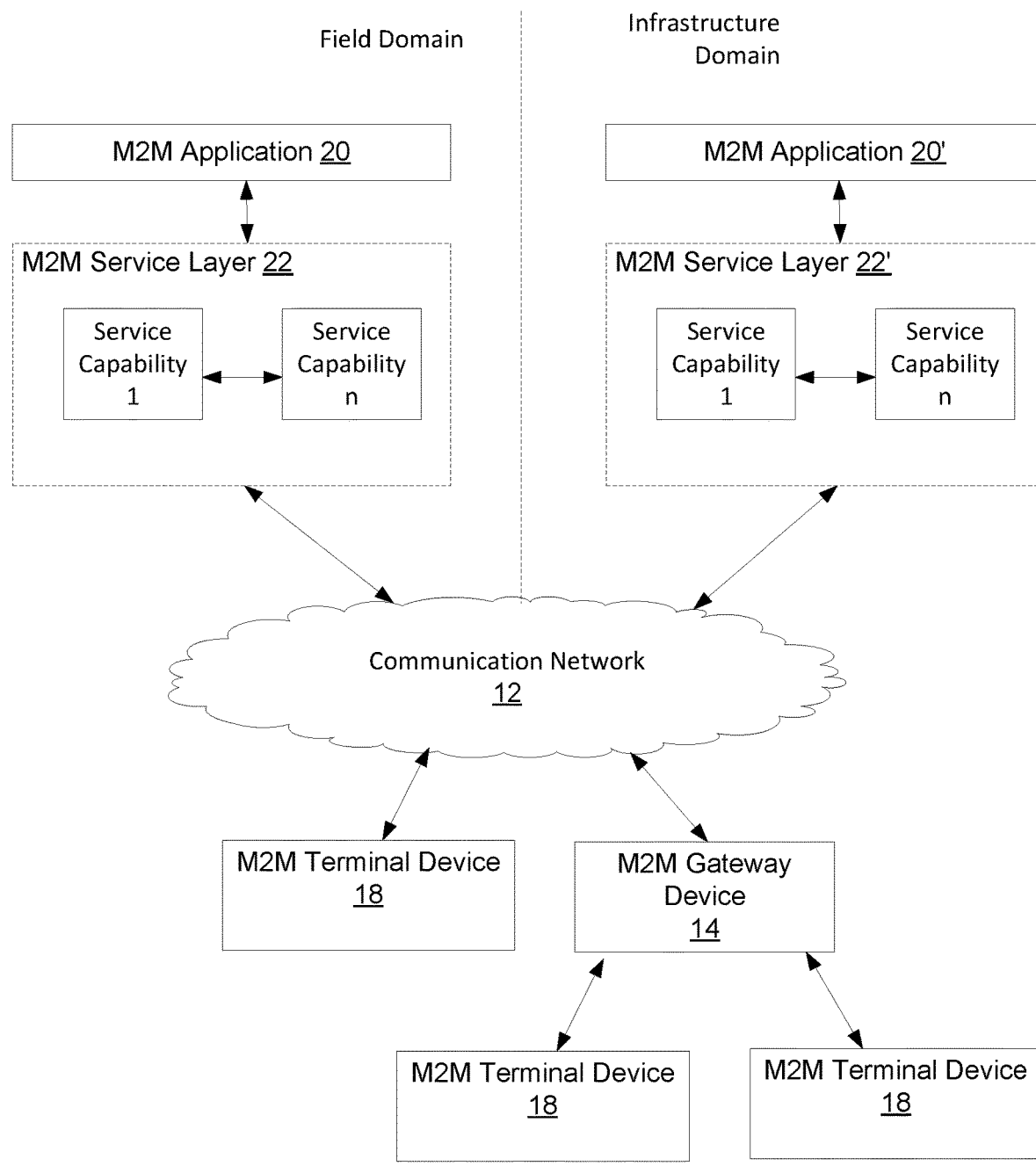
FIG. 17B illustrates an exemplary architecture that may be used within the M2M/IoT communications system illustrated in FIG. 17A.

Referring to FIG. 17B, the illustrated M2M service layer 22 in the field domain provides services for the M2M application 20, M2M gateway devices 14, and M2M terminal devices 18, and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/computer/storage farms, etc.) or the like.

Referring also to FIG. 17B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

In some examples, M2M applications 20 and 20' may include desired applications that communicate using event and action sequencing system 210, as disclosed herein. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

The event and action sequencing system of the present application may be implemented as part of a service layer. The service layer is a middleware layer that supports value-added service capabilities through a set of application programming interfaces (APIs) and underlying networking interfaces. An M2M entity (e.g., an M2M functional entity such as a device, gateway, or service/platform that is implemented on hardware) may provide an application or service. Both ETSI M2M and oneM2M use a service layer that may include the event and action sequencing system of the present application. The oneM2M service layer supports a set of Common Service Functions (CSFs) (i.e., service capabilities). An instantiation of a set of one or more particular types of CSFs is referred to as a Common Services Entity (CSE), which can be hosted on different types of network nodes (e.g., infrastructure node, middle node, application-specific node). Further, the event and action sequencing system of the present application may be implemented as part of an M2M network that uses a Service Oriented Architecture (SOA) or a resource-oriented architecture (ROA) to access services such as the event and action sequencing system of the present application.

As disclosed herein, the service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications r various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware or software and that provides (service) capabilities or functionalities exposed to various applications or devices (i.e., functional interfaces between such functional entities) in order for them to use such capabilities or functionalities.

Figure 17C:
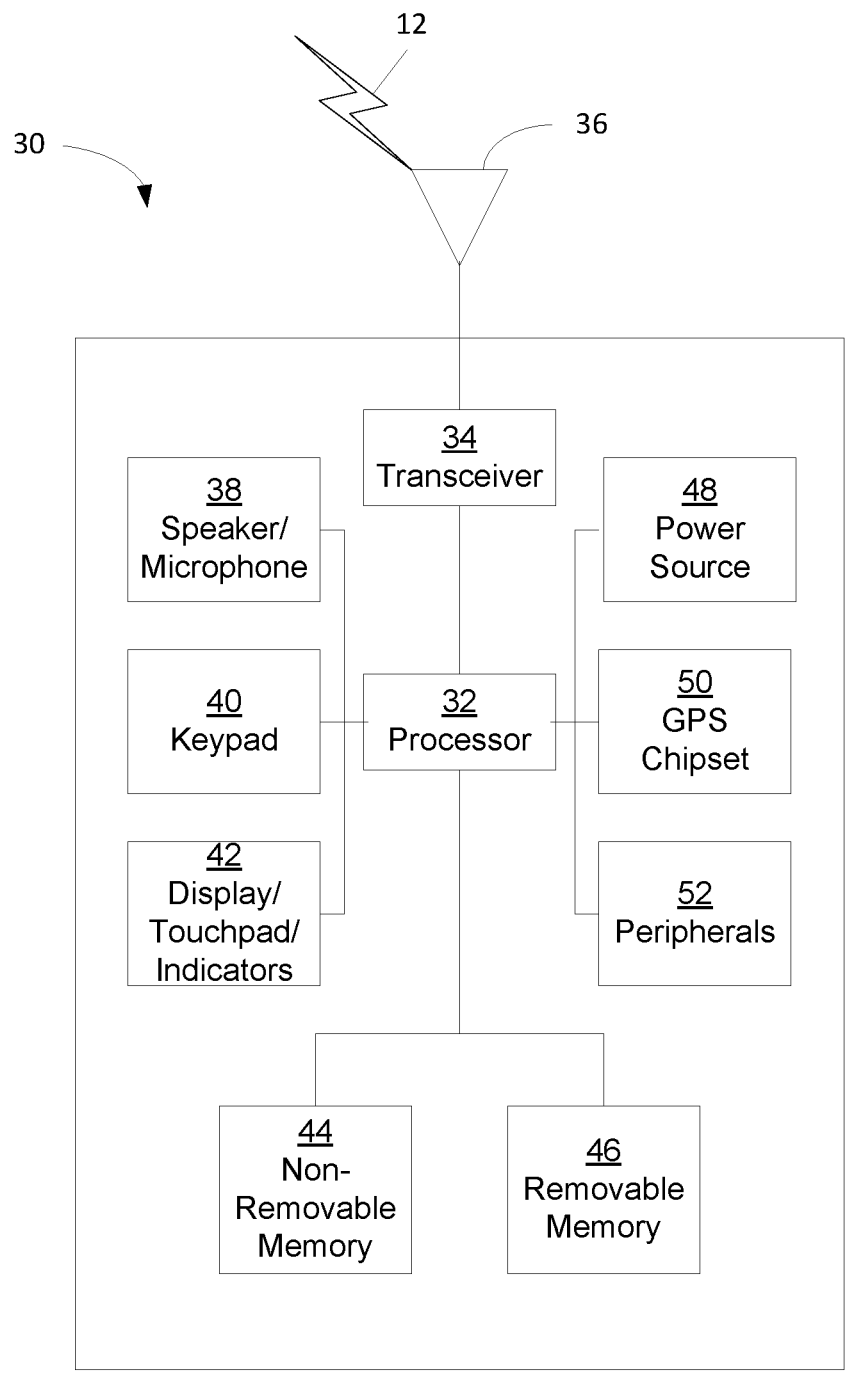
FIG. 17C illustrates an exemplary M2M/IoT terminal or gateway device that may be used within the communications system illustrated in FIG. 17A.

FIG. 17C is a system diagram of an example M2M device 30, such as an M2M terminal device 18 (which may include IoT Device 242) or an M2M gateway device 14 (which may include one or more components of FIG. 5), for example. As shown in FIG. 17C, the M2M device 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with the disclosed subject matter. M2M device 30 (e.g., event and action sequencing system 210, IoT device 242, IoT requestor 241, and others) may be an exemplary implementation that performs the disclosed systems and methods for event and action sequencing system.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, or any other functionality that enables the M2M device 30 to operate in a wireless environment. The processor 32 may be coupled with the transceiver 34, which may be coupled with the transmit/receive element 36. While FIG. 17C depicts the processor 32 and the transceiver 34 as separate components, it will be appreciated that the processor 32 and the transceiver 34 may be integrated together in an electronic package or chip. The processor 32 may perform application-layer programs (e.g., browsers) or radio access-layer (RAN) programs or communications. The processor 32 may perform security operations such as authentication, security key agreement, or cryptographic operations, such as at the access-layer or application layer for example.

The transmit/receive element 36 may be configured to transmit signals to, or receive signals from, an M2M service platform 22. For example, the transmit/receive element 36 may be an antenna configured to transmit or receive RF signals. The transmit/receive element 36 may support various networks and air interfaces, such as WLAN, WPAN, cellular, and the like. In an example, the transmit/receive element 36 may be an emitter/detector configured to transmit or receive IR, UV, or visible light signals, for example. In yet another example, the transmit/receive element 36 may be configured to transmit and receive both RF and light signals. It will be appreciated that the transmit/receive element 36 may be configured to transmit or receive any combination of wireless or wired signals.

In addition, although the transmit/receive element 36 is depicted in FIG. 17C as a single element, the M2M device 30 may include any number of transmit/receive elements 36. More specifically, the M2M device 30 may employ MIMO technology. Thus, in an example, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other examples, the processor 32 may access information from, and store data in, memory that is not physically located on the M2M device 30, such as on a server or a home computer. The processor 32 may be configured to control lighting patterns, images, or colors on the display or indicators 42 in response to whether the methods and systems associated with event and action sequencing in some of the examples described herein are successful or unsuccessful (e.g., request, etc.), or otherwise indicate a status of event and action sequencing system 210 and associated components. The control lighting patterns, images, or colors on the display or indicators 42 may be reflective of the status of any of the method flows or components in the FIG.'s illustrated or discussed herein (e.g., FIG. 1-FIG. 15, etc). Disclosed herein are messages and procedures of event and action sequencing system. The messages and procedures may be extended to provide interface/API for users to request event and action sequencing system information (e.g., EventState resource 218) via an input source (e.g., speaker/microphone 38, keypad 40, or display/touchpad 42). In an addition example, there may be a request, configure, or query of event and action sequencing system information, among other things that may be displayed on display 42.

The processor 32 may receive power from the power source 48, and may be configured to distribute or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled with the GPS chipset 50, which is configured to provide location information (e.g., longitude and latitude) regarding the current location of the M2M device 30. It will be appreciated that the M2M device 30 may acquire location information by way of any suitable location-determination method while remaining consistent with information disclosed herein.

The processor 32 may further be coupled with other peripherals 52, which may include one or more software or hardware modules that provide additional features, functionality or wired or wireless connectivity. For example, the peripherals 52 may include various sensors such as an accelerometer, biometrics (e.g., fingerprint) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The transmit/receive elements 36 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The transmit/receive elements 36 may connect to other components, modules, or systems of such apparatuses or devices via one or more interconnect interfaces, such as an interconnect interface that may comprise one of the peripherals 52.

Figure 17D:
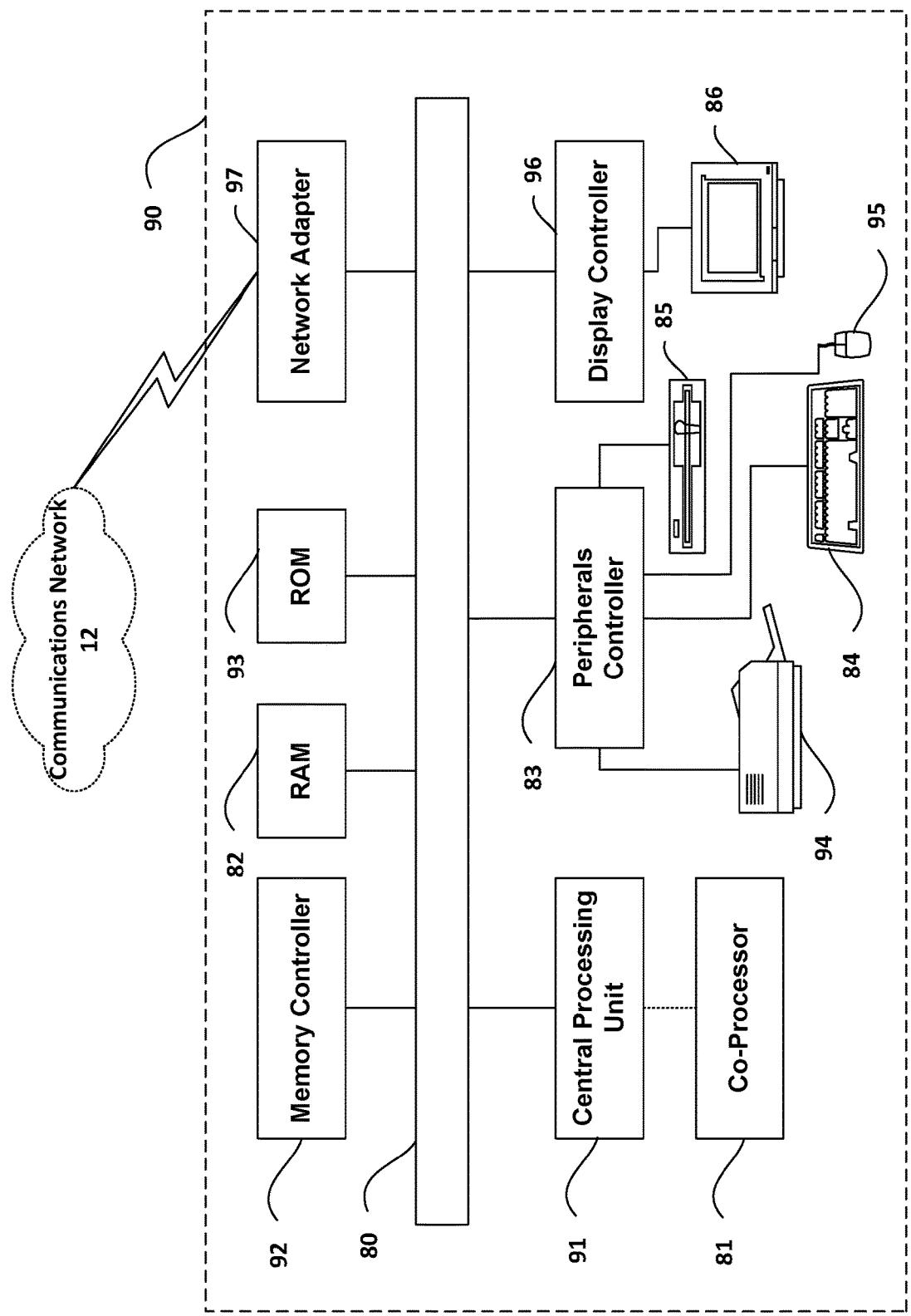
FIG. 17D illustrates an exemplary computing system in which aspects of the communication system of FIG. 17A may be embodied.

FIG. 17D is a block diagram of an exemplary computing system 90 on which, for example, the M2M service platform 22 of FIG. 17A and FIG. 17B may be implemented. Computing system 90 (e.g., M2M terminal device 18 or M2M gateway device 14) may comprise a computer or server and may be controlled primarily by computer readable instructions by whatever means such instructions are stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 or coprocessor 81 may receive, generate, and process data related to the disclosed systems and methods associated with event and action sequencing, such as receiving EASP resource request message.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled with system bus 80 include random access memory (RAM) 82 and read only memory (ROM) 93. Such memories include circuitry that allows information to be stored and retrieved. ROMs 93 generally include stored data that cannot easily be modified. Data stored in RAM 82 can be read or changed by CPU 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may include peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may include network adaptor 97 that may be used to connect computing system 90 to an external communications network, such as network 12 of FIG. 17A and FIG. 17B.

It is understood that any or all of the systems, methods and processes described herein may be embodied in the form of computer executable instructions (e.g., program code) stored on a computer-readable storage medium which instructions, when executed by a machine, such as a computer, server, M2M terminal device, M2M gateway device, or the like, perform or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals per se. As evident from the herein description, storage media should be construed to be statutory subject matter. Computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer. A computer-readable storage medium may have a computer program stored thereon, the computer program may be loadable into a data-processing unit and adapted to cause the data-processing unit to execute method steps when the computer program is run by the data-processing unit.

In describing preferred methods, systems, or apparatuses of the subject matter of the present disclosure—methods and systems associated with event and action sequencing—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps such as FIG. 5-FIG. 6, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

Disclosed herein is a system where the functionality of an EASP is realized. IoT devices may create an EASP based on the use of EASP, EventState, and Transition resources (as shown by FIG. 3, 5, 9, 10, 11). The disclosed methods and systems allow for the update of operations of the EASP while it is in operation (as shown in FIG. 8, 14). Information, such as Table 1-Table 3, or the like, may be considered an application programming interface that may be used to create the EASP.

Processing a request to create resources of a configurable event and action sequencing IoT system that defines components of a complex application. The resources created are EASP, EventState, and Transition resources with their associate parameters.

Enabling the configurable event and action sequencing IoT system to run and the system will manage the operations of the EASP. This includes linking to other EASP that can run in parallel, updating resources within the EASP as the system is running and not affecting operations of the EASP, and providing status of the EASP's operations to the requestor. In addition, the disclosed system has the ability to link multiple EASPs together using parameters (preconditions and/or exit conditions) in the EASP resource. The ability to do this enables the creation of complex IoT applications by linking smaller components together.

The EASP is programmed to perform operations for an application, where the application requires multiple steps (e.g., modules). The wine making application shown in FIG. 1 involves many steps which starts with destemming grapes to start the process of making wine. That is what the EASP is programmed to do. The EASP, for example, sequences through the process one step at a time and has associated EASP resources (e.g., Table 1, Table 2, or Table 3). The transition to another step may be caused by a detected event.

Methods, systems, and apparatuses, among other things, as described herein may provide for means for configurable event and action sequencing in an Internet of Things system which may include obtaining a request, from a requestor, to create an event and action sequencing process resource (EASP resource), wherein the EASP resource may include the following information: EASP ID, description, current status of the EASP, control operations, preconditions, exit conditions, number of events in the EASP, an initial event state when the EASP begins, or final event of the EASP; and in response to the request, creating the EASP resource. The EASP ID, description, current status of the EASP, control operations, preconditions, exit conditions, number of events in the EASP, an initial event state when the EASP begins, or final event of the EASP correspond to a particular parameter. A method, system, computer readable storage medium, or apparatus has means for maintaining communications to enable the transfer of status information to the requestor as needed. A method, system, computer readable storage medium, or apparatus has means for linking the operation of the current EASP with other, existing EASPs using the preconditions or exit conditions parameters. The method, system, computer readable storage medium, or apparatus has means for obtain a request, from a requestor, to create an EventState resource (e.g., a resource associated with the state of the event), wherein the EventState resource may include the following information: identifier used for a current event state, description of the EventState, current status of the event state, set time for the duration of the event state, events that end the current event state to allow for the premature, or asynchronous exit of the event state, events that triggers an event state transition and the next EventState ID to transition to, list of actions that are performed when the Transition Events parameter may be triggered to transition to another event state, or identifier of the next EventState; and in response to the request, creating the EventState resource. The identifier used for a current event state, description of the EventState, current status of the event state, set time for the duration of the event state, events that end the current event state to allow for the asynchronous exit of the event state, events that triggers an event state transition and the next EventState ID to transition to, list of actions that are performed when the Transition Events parameter may be triggered to transition to another event state, or identifier of the next EventState correspond to a particular parameter. A method, system, computer readable storage medium, or apparatus has means for maintaining communications to enable the transfer of status information to the requestor as needed. A method, system, computer readable storage medium, or apparatus has means for determining if new, dynamically added EventState resources to the EASP or changes to existing EventState resources can be integrated without affecting operations of the EASP while the EASP is active. All combinations in this paragraph and the below paragraphs (including the removal or addition of steps) are contemplated in a manner that is consistent with the other portions of the detailed description.

A method, system, computer readable storage medium, or apparatus has means for obtaining a request, from a requestor, to create a Transition resource, wherein the Transition resource may include the following information: event that causes an event state transition, action that may be executed as a result of the occurrence of an event, or next event state to transition to; and in response to the request, creating the Transition resource. The event that causes an event state transition, action that may be executed as a result of the occurrence of an event, or next event state to transition to correspond to a particular parameter. A method, system, computer readable storage medium, or apparatus has means for maintaining communications to enable the transfer of status information to the requestor as needed. A method, system, computer readable storage medium, or apparatus has means for determining if new, dynamically added Transition resources to the EASP or changes to existing Transition resources can be integrated without affecting operations of the EASP while the EASP is actively running. A method, system, computer readable storage medium, or apparatus has means for obtain a request, from a requestor, to create an event and action sequencing process resource (EASP resource), wherein the EASP resource defines a complex Internet of Things application into smaller components of the application through linking events to applicable actions the EASP resource may include the following information: EASP ID, description, current status of the EASP, control operations, preconditions, exit conditions, number of events in the EASP, an initial event state when the EASP begins, or final event of the EASP; and in response to the request, creating the EASP resource. All combinations in this paragraph and the below paragraphs (including the removal or addition of steps) are contemplated in a manner that is consistent with the other portions of the detailed description.

A method, system, computer readable storage medium, or apparatus has means for obtaining a request to create a first event state resource of a plurality of event state resources for an application, wherein an event is a condition in the Internet of Things system that triggers an action to be performed; in response to the request, creating the event state resource, wherein the event state resource is a resource that includes: a current status of a state of the event, and an amount of time for the duration of the state. A method, system, computer readable storage medium, or apparatus has means for receiving a request to add a second event state resource for the application; based on the request to add the second event state resource, analyzing the first event state resource; and based on the analysis of the first event state resource, determining when the second event state resource to the EASP can be integrated without negatively affecting operations of the EASP while the EASP is actively running. A method, system, computer readable storage medium, or apparatus has means for receiving a request to update a second event state resource of the plurality of event state resources for the application; based on the request to update the second event state resource, analyzing the first event state resource; and based on the analysis of the first event state resource, determining when the second event state resource to the EASP can be updated without negatively affecting operations of the EASP while the EASP is actively running. The first event state resource may include a first transition resource. All combinations in this paragraph and the below paragraphs (including the removal or addition of steps) are contemplated in a manner that is consistent with the other portions of the detailed description.

Methods, systems, and apparatuses, computer-readable mediums, among other things, as described herein may provide for means for configurable event and action sequencing in system which may include means for obtaining a request to create a first event state resource of a plurality of event state resources for an application, wherein an event state resource may be a resource associated with a state of an event of the application (e.g., the module or step in an overall process of an application, such as fermentation step in the wine making process), wherein the event (e.g., a detected timer, temperature reading, etc.) may be a detected condition that triggers an action to be performed; based on the request, creating the event state resource, wherein the first event state resource may be a resource that comprises a current status of the state of the event and a transition parameter (e.g., attribute or resource that include information of Table 3 or the like). A method, system, computer readable storage medium, or apparatus has means for receiving a request to add or update a second event state resource for the application; based on the request to add or update the second event state resource, analyzing the first event state resource; and based on the analysis of the first event state resource, determining when the second event state resource to the EASP (which may include the corresponding step or module) can be integrated without negatively affecting operations of the EASP while the EASP may be actively running. The event state resource may include an indication of an event that ends the current state of the event to allow for the exit of the current state of the event. The system and the like may include means for obtaining a request to create a transition resource, wherein the transition resource may be associated with a second event state resource. The first event state resource may include an identifier of the next event state to transition to (e.g., FIG. 15).

What is claimed is:

1. An apparatus for configurable event and action sequencing process (EASP) in an Internet of Things system, the apparatus comprising:
   a processor; and
   a memory coupled with the processor, the memory comprising executable instructions that when executed by the processor cause the processor to effectuate operations comprising:
      obtaining a request to create a first event state resource of a plurality of event state resources for an application, wherein an event state resource is a resource associated with a state of an event of the application, wherein the event is a detected condition that triggers an action to be performed; and
      in response to the request, creating the event state resource,
         wherein the first event state resource is a resource that comprises:
            a current status of the state of the event,
            a transition parameter, wherein the transition parameter comprises an identifier of the next event state resource to transition to based on the detected condition, and
            an action parameter, wherein the action comprises one or more actions to be performed based on the detected condition.

2. The apparatus of claim 1, further operations comprising:
   receiving a request to add a second event state resource for the application;
   based on the request to add the second event state resource, analyzing the first event state resource; and
   based on the analysis of the first event state resource, determining when the second event state resource to the EASP can be integrated without negatively affecting operations of the EASP while the EASP is actively running.

3. The apparatus of claim 1, further operations comprising:
   receiving a request to update a second event state resource of the plurality of event state resources for the application;
   based on the request to update the second event state resource, analyzing the first event state resource; and
   based on the analysis of the first event state resource, determining when the second event state resource to the EASP can be updated without negatively affecting operations of the EASP while the EASP is actively running.

4. The apparatus of claim 1, wherein the event state resource comprises an indication of an event that ends the current state of the event to allow for the exit of the current state of the event.

5. The apparatus of claim 1, wherein the transition parameter comprises actions to be performed based on the detected condition.

6. The apparatus of claim 1, further operations comprising obtaining a request to create a transition resource, wherein the transition resource is associated with a second event state resource.

7. A method for configurable event and action sequencing process (EASP) in an Internet of Things system, the method comprising:
  obtaining a request to create a first event state resource of a plurality of event state resources for an application, wherein an event state resource is a resource associated with a state of an event of the application, wherein the event is a detected condition that triggers an action to be performed; and
  in response to the request, creating the event state resource,
    wherein the first event state resource is a resource that comprises:
      a current status of the state of the event,
      a transition parameter, wherein the transition parameter comprises an identifier of the next event state resource to transition to based on the detected condition, and
      an action parameter, wherein the action parameter comprises one or more actions to be performed based on the detected condition.

8. The method of claim 7, further comprising:
receiving a request to add a second event state resource for the application;
based on the request to add the second event state resource, analyzing the first event state resource; and
based on the analysis of the first event state resource, determining when the second event state resource to the EASP can be integrated without negatively affecting operations of the EASP while the EASP is actively running.

9. The method of claim 7, further comprising:
receiving a request to update a second event state resource of the plurality of event state resources for the application;
based on the request to update the second event state resource, analyzing the first event state resource; and
based on the analysis of the first event state resource, determining when the second event state resource to the EASP can be updated without negatively affecting operations of the EASP while the EASP is actively running.

10. The method of claim 7, wherein the event state resource comprises an indication of an event that ends the current state of the event to allow for the exit of the current state of the event.

11. The method of claim 7, further comprising obtaining a request to create a transition resource, wherein the transition resource is associated with a second event state resource.

12. A computer-readable storage medium storing computer executable instructions that when executed by a computing device cause said computing device to effectuate operations comprising:
  obtaining a request to create a first event state resource of a plurality of event state resources for an application, wherein an event state resource is a resource associated with a state of an event of the application, wherein the event is a detected condition that triggers an action to be performed; and
  in response to the request, creating the event state resource,
    wherein the first event state resource is a resource that comprises:
      a current status of the state of the event,
      a transition parameter, wherein the transition parameter comprises an identifier of the next event state resource to transition to based on the detected condition, and
      an action parameter, wherein the action comprises one or more actions to be performed based on the detected condition.

13. The computer-readable storage medium of claim 12, the operations further comprising:
receiving a request to add a second event state resource for the application;
based on the request to add the second event state resource, analyzing the first event state resource; and
based on the analysis of the first event state resource, determining when the second event state resource to the EASP can be integrated without negatively affecting operations of the EASP while the EASP is actively running.

14. The computer-readable storage medium of claim 12, the operations further comprising:
receiving a request to update a second event state resource of the plurality of event state resources for the application;
based on the request to update the second event state resource, analyzing the first event state resource; and
based on the analysis of the first event state resource, determining when the second event state resource to the EASP can be updated without negatively affecting operations of the EASP while the EASP is actively running.

15. The computer-readable storage medium of claim 12, wherein the event state resource comprises an indication of an event that ends the current state of the event to allow for the exit of the current state of the event.

16. The computer-readable storage medium of claim 12, the operations further comprising obtaining a request to create a transition resource, wherein the transition resource is associated with a second event state resource.

* * * * *